United States Patent [19]

Brachten et al.

[11] 4,323,363
[45] Apr. 6, 1982

[54] DYEING OF MIXED FIBERS

[75] Inventors: Gert Brachten; Friedrich Engelhardt; Heinz Helling, all of Frankfurt am Main; Joachim Ribka, Offenbach am Main-Bürgel, all of Fed. Rep. of Germany

[73] Assignee: Cassella Aktiengesellschaft, Frankfurt am Main, Fed. Rep. of Germany

[21] Appl. No.: 152,564

[22] Filed: May 22, 1980

Related U.S. Application Data

[60] Continuation of Ser. No. 940,171, Sep. 7, 1978, abandoned, which is a division of Ser. No. 723,985, Sep. 16, 1976, abandoned.

[30] Foreign Application Priority Data

Sep. 18, 1975 [DE] Fed. Rep. of Germany ....... 2541625
Sep. 20, 1975 [DE] Fed. Rep. of Germany ....... 2542051

[51] Int. Cl.³ .......................... D06P 5/08; D06P 3/82; C08F 222/36
[52] U.S. Cl. ........................................... 8/532; 8/662; 526/264; 526/287; 526/304; 526/307.1; 526/307.2; 526/307.5; 526/307.6
[58] Field of Search ................... 8/553, 557, 532, 918, 8/922

[56] References Cited

U.S. PATENT DOCUMENTS

3,867,172 2/1975 Uhl .................................. 260/37 X
3,940,247 2/1976 Sthare .................................. 8/557
3,977,828 8/1976 Becker .................................. 8/558

FOREIGN PATENT DOCUMENTS

1182828 12/1964 Fed. Rep. of Germany ...... 526/303
786805 11/1957 United Kingdom .................... 8/557
1015795 1/1966 United Kingdom ................ 526/303
1108261 4/1968 United Kingdom .................... 8/557
1167524 10/1969 United Kingdom .................... 8/557

*Primary Examiner*—C. A. Henderson
*Attorney, Agent, or Firm*—Connolly and Hutz

[57] ABSTRACT

Hazy or frosty appearance of mixtures of polyester and cellulosic fibers when dyed with disperse dyes is suppressed by adding to the aqueous dye bath a small amount of low copolymer of acrylamide or the like with a water-soluble maleic or fumaric acid ester, and with or without an additional water-soluble vinyl compound, all as defined infra. The copolymer is normally a liquid miscible with water in all proportions at 10° C. or below. Disperse dye is fixed to the polyester fibers by heating as in the Thermosol process. Dyes for the cellulosic fibers can also be included in the dye bath so that the cellulosic fibers are also dyed in the same treatment. Alternatively the cellulosic fibers can be separately dyed, preferably after the polyester fibers are dyed.

10 Claims, No Drawings

DYEING OF MIXED FIBERS

This application is a continuation of application Ser. No. 940,171 filed Sept. 7, 1978, now abandoned, which is a division of Ser. No. 723,985 filed Sept. 16, 1976, now abandoned.

BACKGROUND OF THE INVENTION

The present invention relates to the dyeing of mixtures of polyester fibers with cellulosic fibers.

Mixtures of the foregoing fibers, as is woven or knitted textile fabrics, have their polyester fibers easily dyed on a continuous basis with disperse dyes, but this process suffers from a severe shortcoming: the goods dyed by this method show, especially if deep shades are to be dyed, a grey haze or frosted appearance developed on the dyed product. Such haze or frosted appearance makes the dyed product seem ligher in hue and can also detract from its attractiveness. This grey haze is also not eliminated by the subsequent dyeing of the cellulosic constituent of the goods.

It has been generally necessary to singe the hazy or frosty dyed products to remove the numerous fine fiber ends, in order to overcome the foregoing difficulty, but such singeing is an extra treatment step and it reduces the pleasant fluffy handle desired in such textiles.

Among the objects of the present invention is the provision of a simple dyeing technique that suppresses the above-described development of a hazy and frosty appearance, as well as the provisions of novel dye liquors and additives in that connection.

The foregoing as well as additional objects of the present invention will be more fully understood from the following description of several of its exemplifications.

SUMMARY OF THE INVENTION

According to the present invention the above-described development of a hazy or frosty appearance in the disperse dyeing of polyester fibers when mixed with cellulosic fibers, by applying the disperse dye from a bath containing about 0.2 to about 5 grams per liter of a normally liquid copolymer of (a) one mol acrylamide, alpha- or beta-methyl acrylamide, maleamic acid or fumaramic acid, with (b) from about 0.01 to about 5 mols of

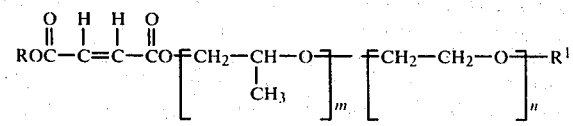

where
R is H, NH$_4$, Na, K, HOCH$_2$—CH$_2$— or

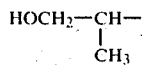

R$^1$ is alkyl with up to 20 carbons, alkenyl with from 3 to 20 carbons, phenyl, naphthyl, alkylphenyl with up to 12 alkyl carbons, alkanoyl or alkenoyl with 4 to 20 carbons; and
m plus n are whole numbers totalling between 1 and about 30, and (c) from zero to ten mols of

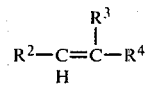

where
R$^2$ and R$^3$ are both H or one of them is H and the other methyl, or R$^3$ is H and R$^2$ is carboxyl or alkoxycarbonyl having up to 10 alkoxy carbons, or R$^2$ is H and R$^3$ is —CH$_2$COOH or alkoxycarbonylmethyl having up to 10 alkoxy carbons, and any of these R$^3$ alkoxycarbonyls can be substituted by hydroxy, alkoxy with up to 10 carbons, or mono- or di-alkyl amino having up to 4 carbons; and R$^4$ is cyano, carboxyl, —SO$_3$H, sulfo-alkyl having up to 6 carbons, alkanoyloxy with up to 6 carbons, alkanoylamino with up to 7 carbons that can form a pyrrolidone, piperidone, caprolactam ring with the amino, alkoxycarbonyl with up to 10 alkoxy carbons and in which the alkyl of the alkoxy can be further substituted with hydroxy, up to C$_4$ alkoxy, amino, mono- or di-alkyl amino having up to 4 carbons or

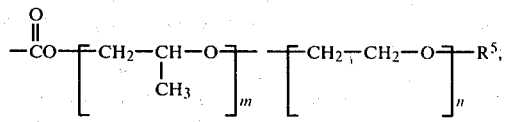

R$^5$ being alkyl with up to 20 carbons, alkenyl with from 3 to 20 carbons, phenyl, naphtyl, alkylphenyl with up to 12 alkyl carbons, or alkanoyl or alkenoyl with 4 to 20 carbons and
m and n are whole numbers totalling between 1 and about 30 the copolymer being miscible with water in all proportions at about 10° C., and in a 4% by weight solution in water giving a viscosity of between about 500 and about 20,000 centipoise, preferably of between about 800 and about 20,000 centipoise, at 25° C.

DETAILED DESCRIPTION OF THE INVENTION

The hazy or frosty appearance is most troublesome when the mixture of polyester and cellulosic fibers contains about 20 to about 80% by weight cellulosic fibers. While any cellulosic fiber such as natural or mercerized cottons, cellulose acetates and regenerated cellulose give the foregoing problem, viscose rayon is the greatest offender. The undesired appearance is also developed when a minor amount of other fibers is included in the foregoing polyester-cellulosic fiber mixtures.

Depending on the desired color density of the polyester fibers the disperse dye bath can contain 1 to about 100 grams of disperse dye per liter. More than one disperse dye can be used in such a bath, and mixtures of such dyes are usually required to produce the deepest shades.

Any disperse dye for polyester fibers can be used pursuant to the present invention. Thus anthraquinone, azo methine and quinophthalone dyes are typically of those with which the present invention works well. Preferred are anthraquinone and azo dyes free of water-solubilizing groups, and examples of such preferred dyes include

| | | |
|---|---|---|
| Monoazo dye | C.I.* | Disperse Blue 79 |
| Monoazo dye | C.I. | Disperse Red 166 |
| Disazo dye | C.I. | Disperse Orange 13 |
| Monoazo dye | C.I. | Disperse Brown 5 |
| Azo dye | C.I. | Disperse Yellow 5 |
| Anthraquinone dye | C.I. | Disperse Blue 60 |
| Disazo dye | C.I. | Disperse Yellow 68 |

*Colour Index

Methine dyes C.I. Disperse Yellows 31, 49, 61, 73 and 99, as well as quinophthalone dyes C.I. Disperse Yellows 54, 64 and 67 are also suitable.

In accordance with current practice baths of disperse dyes have the dyes reduced to particles of micron size, that is up to about 5 microns in greatest dimension, dispersed in water with the help of a dispersing or wetting agent and if desired the baths also contain defoaming agents to reduce foaming. Examples of suitable dispersing or wetting agents include water-soluble salts of long-chain alkanesulfonic acids, condensation products of phenols (e.g. 2,4-xylenol or alphanaphthol) with formaldehyde and sodium sulfite, and ethoxylated and/or propoxylated phenols, long-chained alkanols, alkanecarboxylic acid or long chain alkylamines.

Suitable defoamers include silicone oils such as linear dimethyl silicones and organic fluorine-phosphorous compounds and organic phosphorous compounds, such as tri-isobutyl phosphate.

The dye baths of the present invention can also contain other additives such as padding auxiliaries for increasing the bath viscosity. Water-soluble homopolymers of acrylamide are examples of such auxiliaries.

Dyes for the cellulosic fibers can also be incorporated in the dye baths of the present invention. Dissolved reactive or direct dyes are preferred as such additives, and enable the dyeing of the cellulosic fibers subsequent to the polyester dye treatment. Examples of suitble additive dyes for the cellulosic fibers include:

| | |
|---|---|
| Monoazo Dye | C.I. Direct Orange 17 |
| Monoazo Dye | C.I. Direct Blue 256 |
| Azo-Thiazol Dye | C.I. Direct Orange 18 |
| Disazo Dye | C.I. Direct Orange 10 |
| Disazo Dye | C.I. Direct Red 72 |
| Trisazo Dye | C.I. Direct Orange 16 |
| Stilbene Dye | C.I. Direct Orange 14 |
| Monoazo Dye | C.I. Reactive Orange 16 |
| Monoazo Dye | C.I. Reactive Yellow 15 |
| Disazo Dye | C.I. Reactive Black 31 |

The dyeing of the cellulose fibers in the fiber mixtures of the present invention can be effected separately from the polyester fiber dyeing, if desired. In such separate dyeing sequence it is preferred that the polyester fiber dyeing be effected first.

The impregnation of a polyester-cotton mixed fabric with the dyeing liquors can be effected by padding, dipping, slop-padding, spraying or in any other way. The impregnation step is in general followed by squeezing-off of the impregnated mixed fabric, during which the fabric can be adjusted to a particular desired liquor pick-up. After squeezing-off, the impregnated fabric is generally subjected to an intermediate drying, preferably at temperatures of 110° to 130° C., for example by festooning in warm air, and is then heated to temperatures of 140° to 220° C., preferably 170° to 220° C., by exposure to hot air, superheated steam or contact heat, or example by contacting with heated rollers, for 10 to 100 seconds, preferably 30 to 90 seconds. Such heating fixes the disperse dyestuff to the polyester constituent of the mixed fabric.

The copolymer additives according to the present invention are readily soluble in water in all proportions at 10° C. or below and show inverse solubility characteristics, that is to say their solubility in water is greater at low temperatures than at higher temperatures. A large number of these copolymers show a cloud point in the temperature range between 10° and 95° C.

Another feature of the copolymers of the present invention is that they are of statistical or random nature. This means that the comonomer units are randomly or statistically distributed in the polymer chain.

Typical $R^4$ groups are sulphoalkyl groups such as sulphomethyl, sulphoethyl, 2-sulphopropyl, 3-sulphopropyl and sulphobutyl groups; alkanoyloxy groups such as formyloxy, acetoxy, propionyloxy, butyryloxy, isobutyryloxy, valeryloxy, isovaleryloxy and caproyloxy alkanoylamino groups such as formylamino, acetylamino, propionylamino, butyrylamino, isobutyrylamino, valerylamino, isovalerylamino and caproylamino, as well as pyrrolidone, piperidone or caprolactam radicals bonded via the nitrogen, formyl-n-butylamino, acetyl-n-butylamino, acetylethylamino, acetylmethylamino, propionylethylamino, propionylmethylamino, butyrylpropylamino, isobutyrylethylamino, valerylethylamino and caproylmethylamino; and alkoxycarbonyl groups such as methoxycarbonyl, ethoxycarbonyl, propoxycarbonyl, isopropoxycarbonyl, butoxycarbonyl, isobutoxycarbonyl, sec.-butoxycarbonyl, tert.-butoxycarbonyl, amyloxycarbonyl, hexyloxycarbonyl, 2-hexyloxycarbonyl, 3-hexyloxycarbonyl 2-ethylbut-1-oxycarbonyl, hydroxyethoxycarbonyl, methoxyethoxycarbonyl, ethoxyethoxycarbonyl, propoxyethoxycarbonyl, hydroxypropoxycarbonyl, butoxypropoxycarbonyl, isobutoxyethoxycarbonyl, hydroxybutoxycarbonyl, methoxybutoxycarbonyl, methylaminoethoxycarbonyl, ethylaminoethoxycarbonyl, dimethylaminoethoxycarbonyl, methylethylaminopropoxycarbonyl, diethylaminobutoxycarbonyl and diethylaminoethoxycarbonyl.

Typical $R^1$ groups are decyl, undecyl, duocecyl, tridecyl, tetradecyl, pentadecyl, hexadecyl, heptadecyl, octadecyl, nonadecyl, eicosyl and oleyl, or the mixed alkyl radicals tallow fat alkyl or coconut oil alkyl, the phenyl radical, the alkylphenyl radicals p-cresyl, p-tert.-butylphenyl, p-nonyl-phenyl, 2,4,6-tri-tert.-butylphenyl and 2,4,6-tri-isopropylphenyl, the 1- or 2-naphthyl radical or the alkanoyl groups capryl, undecoyl, lauroyl, tridecoyl, myristoyl, pentadecoyl, palmitoyl, margaroyl, stearoyl, nonadecoyl, eicosoyl and oleoyl or the mixed alkanoyl radicals tallow fat alkanoyl or coconut oil alkanoyl.

Examples of alkoxycarbonyl $R^2$ groups are methoxycarbonyl, ethoxycarbonyl, propoxycarbonyl, isopropoxycarbonyl, butoxycarbonyl, sec.-butoxycarbonyl, tert.-butoxycarbonyl, amyloxycarbonyl, isoamyloxycarbonyl and hexyloxycarbonyl. Such alkoxycarbonyl groups carrying hydroxyl, alkoxy or alkylamino groups are, for example, hydroxyethoxycarbonyl, methoxyethoxycarbonyl, ethoxyethoxycarbonyl, propoxyethoxycarbonyl, hydroxypropoxycarbonyl, butoxypropoxycarbonyl, methoxybutoxycarbonyl, methylaminoethoxycarbonyl, ethylaminoethoxycarbonyl, dimethylaminoethoxycarbonyl, diethylaminoethoxycarbonyl, methylethylaminopropoxycarbonyl, diethylminobutoxycarbonyl.

Suitable alkylene oxide ether structures for ingredient (b) are:

—O—(CH₂—CH₂—O—)₂CH₃
—O—(CH₂—CH₂—O—)₁₀CH₃

—O[(CH₂—CH₂—O—)₂ . (CH₂—CH—O—)₃]—CH₃
                                  |
                                  CH₃

—O—(CH₂CH₂—O—)₅C₂H₅
—O(CH₂CH₂O)₁₈C₂H₅
—O—(CH₂—CH₂—O—)₂C₄H₉(n)

—O—[(CH₂—CH₂—O—)₂ . (CH₂—CH—O)₂]C₄H₉ (iso)
                                            |
                                            CH₃

—O—(CH₂—CH—O—)₄—C₆H₁₃
            |
            CH₃

—O—(CH₂—CH₂O)₁₅C₄H₉ (n)
—O—(CH₂—CH₂—O—)₈C₈H₁₇

—O—[(CH₂—CH₂—O—)₆(CH₂CH—O—)₄]C₉H₁₉
                                    |
                                    CH₃

—O—[(CH₂—CH₂—O—) . (CH₂CH—O—)₂]C₉H₁₉
                                    |
                                    CH₃

—O—(CH₂CH₂—O—)₆C₁₀H₂₁

—O—(CH₂CH—O—)₆C₁₀H₂₁
         |
         CH₃

—O—(CH₂CH₂—O)₂₀C₁₀H₂₁

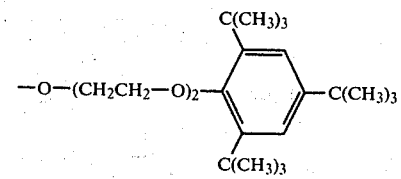

—O—(CH₂CH₂—O—)₂—C₁₈H₃₇
—O—(CH₂CH₂—O—)₂—CO—C₁₁H₂₃

—O—(CH₂—CH—O—)₂—CO—C₁₅H₃₁
            |
            CH₃

—O—(CH₂—CH—O—)₂—C₁₂H₂₅
            |
            CH₃

—O—(CH₂—CH—O—)₂—CO—C₁₇H₃₅
            |
            CH₃

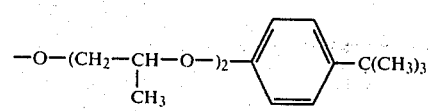

—O—(CH₂CH₂O—)₂-tallow fat alkyl

—O—(—CH₂—CH—O—)₂— coconut oil alkyl
              |
              CH₃

—O—(CH₂CH₂—O—)₂-coconut oil alkanoyl

—O—[(CH₂CH₂—O—)₂ . (CH₂CH—O)]— tallow fat alkanoyl
                                |
                                CH₃

—O(CH₂CH₂O—)₄—C₁₈H₃₇

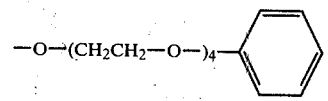

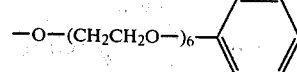

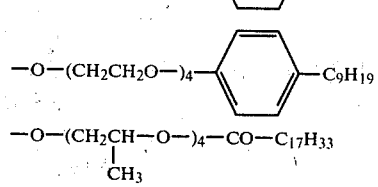

—O—(CH₂CH₂O)₇—C₁₈H₃₇
—O—(CH₂CH₂O—)₇—CO—C₉H₁₉

—O—[(CH₂—CH₂—O—)₃ . (CH₂CH—O—)₃]—C₁₀H₂₁
                                      |
                                      CH₃

—O—[(CH₂CH₂O—)₂ . (CH₂CHO—)₄]—C₁₈H₃₇
                              |
                              CH₃

—O—[(CH₂CH₂O—)₄(CH₂CHO—)₂]—CO—C₁₇H₃₅
                                    |
                                    CH₃

—O—[(CH₂CH₂O—)₄(CH₂CHO—)₃]—CO—C₁₅H₃₁
                                    |
                                    CH₃

—O—(CH₂CH₂O—)₇—C₁₅H₃₁
—O(CH₂CH₂O)₇—C₁₇H₃₅
—O(CH₂CH₂O)₇—C₁₈H₃₅

—O—(CH₂CHO—)₈—COC₉H₁₉
          |
          CH₃

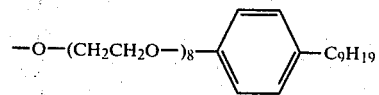

—O—(CH₂CHO—)₈—CO—C₁₃H₂₇
          |
          CH₃

—O—(CH₂CH₂O—)₈—C₁₈H₃₇
—O—(CH₂CH₂O)₇—CO—C₁₇H₃₅
—O—(CH₂CH₂O)₈-tallow fat alkyl

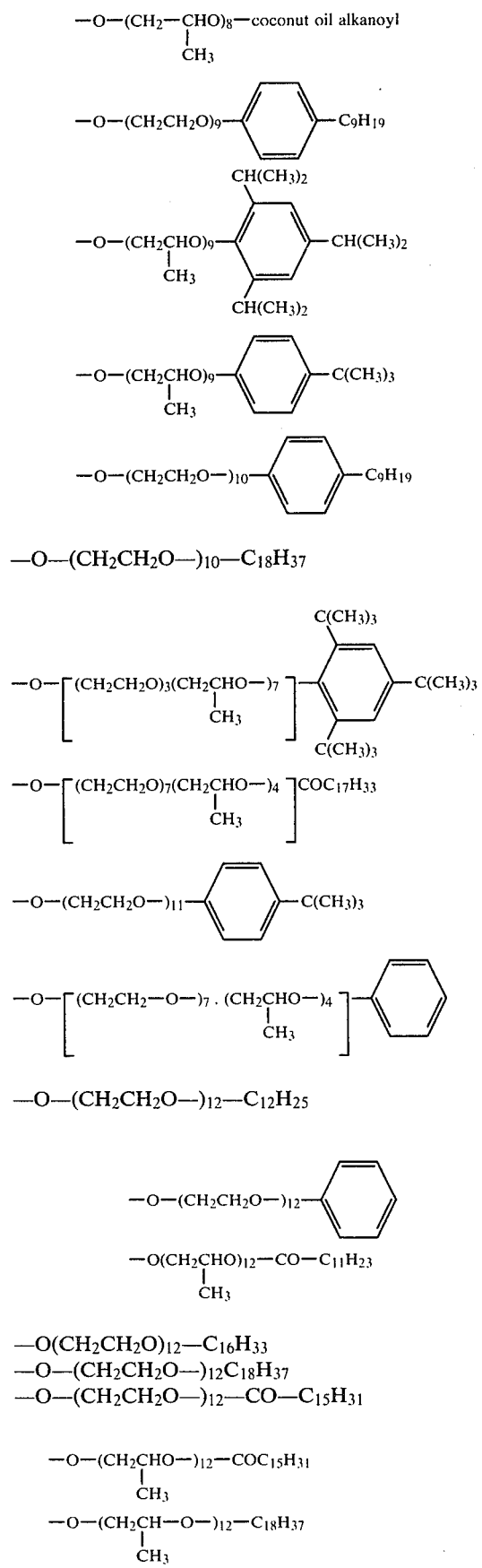
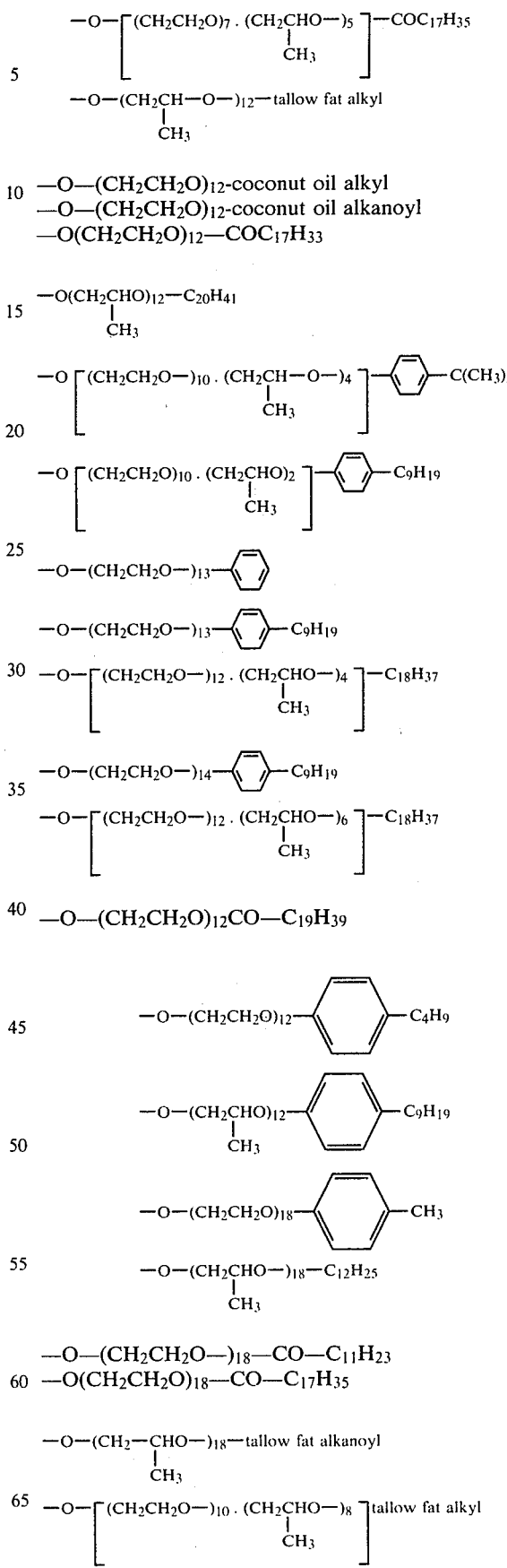

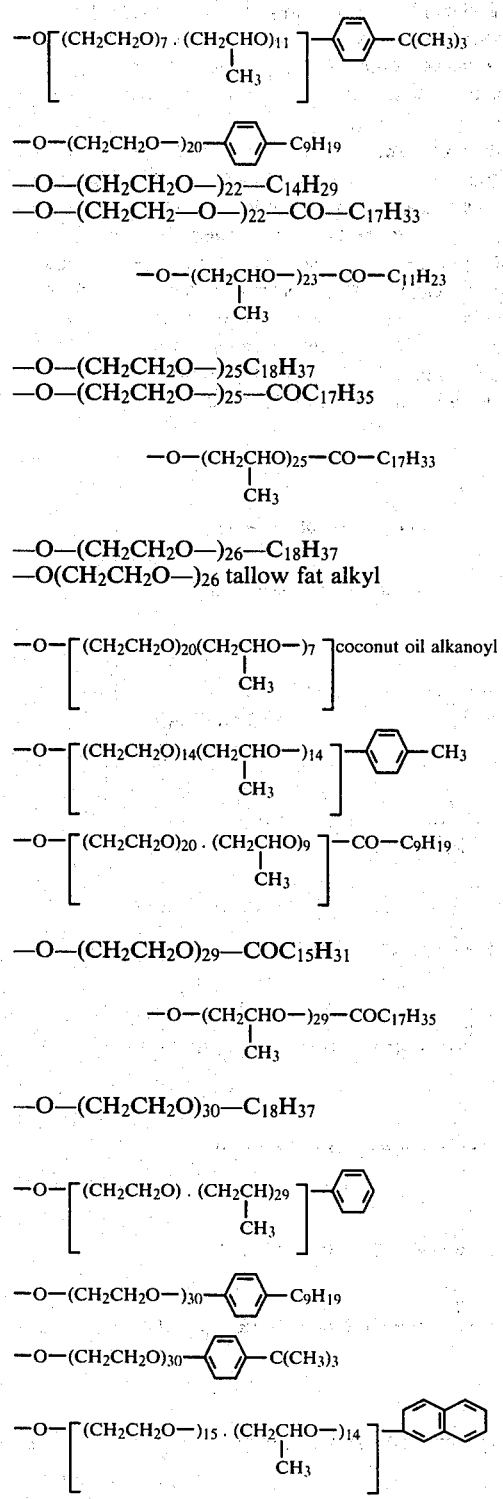

In the polyether chains shown in square brackets the alkyleneoxy chain members shown can be distributed statistically or in blocks of any length.

Preferred copolymers of the present invention are those in which monomer (a) is acrylamide or methacrylamide. Also preferred are copolymers in which $R^4$ is cyano, carboxyl, the sulphonic acid group, sulphomethylene, alkanoyloxy with 2 or 3 C atoms, alkanoylamino with 2-6 C atoms, alkoxycarbonyl with 1-5 C atoms in the alkoxy radical, the alkoxy radical further being optionally substituted by a hydroxyl or dimethylamino group; of the noted polyoxyalkylene structures in which $R^5$ is an alkyl group with 13-18 C atoms, tallow fat alkyl, coconut oil alkyl, oleyl, phenyl, nonylphenyl, alkanoyl with 14-18 C atoms, alkenoyl with 18 C atoms, tallow fat alkanoyl, coconut oil alkanoyl or oleoyl, while $R^2$ is hydrogen and $R^3$ is hydrogen or methyl.

A further group of preferred copolymers comprises those in which $R^1$ is alkyl with 13-18 carbon atoms, tallow fat alkyl coconut oil alkyl, oleyl, phenyl, alkylphenyl with 4-9 carbon atoms in the alkyl groups, alkanoyl with 14-18 C atoms, alkenoyl with 18 C atoms, tallow fat alkanoyl, coconut oil alkanoyl or oleoyl.

Further preferred copolymers according to the invention are those in which the mol ratio of the comonomers (a), (b) and (c) is 1:0.05-1:0-3, respectively.

The copolymers according to the present invention are readily manufactured by copolymerizing acrylamide, alpha- or beta-methacrylamide, maleamic acid or fumaramic acid with the appropriate maleic or fumaric acid esters corresponding to the above-designated ingredient (b) and, optionally, with vinyl compounds corresponding to the above-designated ingredient (c), in the molar ratio 1:0.01-5:0-10, respectively. The polymerization is advantageously carried out in an aqueous medium at temperatures between 0° and 95° C., preferably between 40° and 80° C., and at pH values between 2.5 and 9, preferably at 4 to 7. To adjust the pH value, all acids and bases usually employed for the purpose may be used although they are generally not necessary since the desired pH value is set up autogenously in the reaction mixtures. Polymerization temperatures above 95° C. can also be used, although with more trouble.

The polymerization reaction can be initiated by catalytic amounts of all substances which form free radicals. Such initiators include organic per-compounds such as for example benzoyl peroxide, alkyl hydroperoxides such as for example butyl hydroperoxide, cumene hydroperoxide and p-methane hydroperoxide, dialkyl peroxides such as di-tert.-butyl peroxide, and inorganic per-compounds such as for example potassium, sodium or ammonium persulphate and hydrogen peroxide, and azo compounds such as for example azobisisobutyronitrile or azobisisobutyramide. It is advantageous to employ the organic or inorganic per-compounds in combination with corresponding amounts of reducing agents. Examples of suitable reducing agents include sodium pyrosulphite, sodium bisulphite and the usual condensation products of formaldehyde with sulphoxylates. The polymerization reaction can be carried out particularly advantageously using Mannich adducts of sulphinic acids, aldehydes and amino compounds, such as are described in German Patent 1,301,566.

Small amounts of moderators, which smooth the course of the reaction of flattening reaction rate changes with respect to time, improve the reproducibility of the reaction and hence lead to more uniform products with extremely little variation in quality. Examples of suitable moderators of this type include nitrilo-trispropionylamide, and hydrohalides of monoalkylamines, dialkylamines or trialkylamines such as dibutylamine hydrochloride. Furthermore, so-called regulators can be added to the polymerization mixtures, that is to say compounds which influence the molecular weight of the polymers formed. Suitable regulators are, for example, alcohols such as methanol, ethanol, propanol, isopropanol, n-butanol, sec.-butanol and amyl alcohol, alkylmercaptans such as dodecylmercaptan and tert.-dodecylmercaptan, isooctyl thioglycolate, and some halogen compounds, such as carbon tetrachloride, chloroform and methylene chloride.

The polymerization can be carried out at atmospheric pressure or at reduced or elevated pressures.

Vinyl compounds which can be used as ingredients (c) are, for example, acrylonitrile, methacrylonitrile, acrylic acid, methacrylic acid, crotonic acid, maleic acid, fumaric acid, itaconic acid, vinylsulphonic acid, allylsulphonic acid, methallylsulphonic acid, vinyl esters of aliphatic carboxylic acids with 1–6 C atoms, such as, for example, vinyl formate, vinyl acetate, vinyl propionate, vinyl butyrate, vinyl isobutyrate, vinyl valerate and vinyl caproate, N-vinylamides, such as, for example, N-vinylformamide, N-vinylacetamide, N-vinyl-N-methylacetamide, N-vinylpropionamide, N-vinyl-N-ethylpropionamide, N-vinylbutyramide, N-vinylisobutyramide, N-vinyl-N-ethylisobutyramide, N-vinyl-N-methylbutyramide, N-vinyl-N-butylacetamide, N-vinyl-N-propylvaleramide, N-vinyl-N-methylvaleramide, N-vinylvaleramide, N-vinylcaproamide, N-vinyl-N-ethylcaproamide and cyclic N-vinylamides, such as, for example, N-vinylpyrrolidone, N-vinylpiperidone or N-vinylcaprolactam, esters of unsaturated carboxylic acids, for example of acrylic acid, methacrylic acid, crotonic acid, maleic acid, fumaric acid and itaconic acid, with 1–10 carbon atoms in the alkanol radical, such as, for example, methyl acrylate, ethyl acrylate, propyl acrylate, isopropyl acrylate, butyl acrylate, isobutyl acrylate, sec. butyl acrylate, tert. butyl acrylate, amyl acrylate, hexyl acrylate, methyl methacrylate, ethyl methacrylate, propyl methacrylate, butyl methacrylate, tert. butyl methacrylate, amyl methacrylate, hexyl methacrylate, methyl crotonate, ethyl crotonate, propyl crotonate, butyl crotonate, amyl crotonate, hexyl crotonate, β-hydroxyethyl acrylate, β-hydroxyethyl methacrylate, β-hydroxyethyl crotonate, β-hydroxypropyl acrylate, γ-hydroxypropyl acrylate, β-hydroxypropyl methacrylate, γ-hydroxypropyl methacrylate, β-hydroxypropylcrotonate, β-hydroxybutyl acrylate, δ-hydroxybutyl acrylate, δ-hydroxybutyl methacrylate, β-hydroxybutyl crotonate, β-hydroxy hexyl acrylate, β-hydroxyhexyl methacrylate, β-hydroxyhexyl crotonate, β-dimethylaminoethyl acrylate, β-dimethylaminopropyl methacrylate, β-dipropylaminoethyl methacrylate, δ-dimethylaminobutyl crotonate, β-diethylaminohexyl acrylate, β-dimethylaminohexyl acrylate, heptyl acrylate, heptyl methacrylate, octyl acrylate, octyl crotonate, nonyl methacrylate, decyl acrylate, decyl methacrylate, decyl crotonate, maleic acid diethyl ester, maleic acid dibutyl ester, maleic acid monomethyl ester, maleic acid monobutyl ester, maleic acid dihexyl ester, fumaric acid dimethyl ester, fumaric acid diisopropyl ester, fumaric acid monoamyl ester, fumaric acid monohexyl ester, maleic acid mono-β-hydroxyethyl ester, maleic acid di-β-hydroxyethyl ester, fumaric acid mono-β-hydroxypropyl ester, fumaric acid di-γ-hydroxypropyl ester, maleic acid mono-β-hydroxybutyl ester, fumaric acid di-δ-hydroxybutyl ester, maleic acid mono-β-hydroxyhexyl ester, maleic acid di-β-hydroxyhexyl ester, maleic acid mono-β-diethylaminoethyl ester, maleic acid di-β-dimethylaminopropyl ester, fumaric acid mono-β-dipropylaminoethyl ester, maleic acid mono-δ-dimethylaminobutyl ester, maleic acid di-δ-dimethylaminobutyl ester, maleic acid mono-β-diethylaminohexyl ester, fumaric acid di-β-dimethylaminohexyl ester, itaconic acid monomethyl ester, itaconic acid dimethyl ester, itaconic acid monobutyl ester, itaconic acid dihexyl ester, itaconic acid mono-β-hydroxyethyl ester, itaconic acid di-β-hydroxypropyl ester, itaconic acid monodiethylaminoethyl ester, itaconic acid di-β-dimethylaminopropyl ester, maleic acid monoheptyl ester, maleic acid diheptyl ester, fumaric acid diheptyl ester, maleic acid dioctyl ester, itaconic acid dioctyl ester, maleic acid mononyl ester, fumaric acid dinonyl ester, maleic acid monodecyl ester, fumaric acid didecyl ester, itaconic acid monodecyl ester, maleic acid didecyl ester and, for example, esters of the formulae indicated in the following List 1:

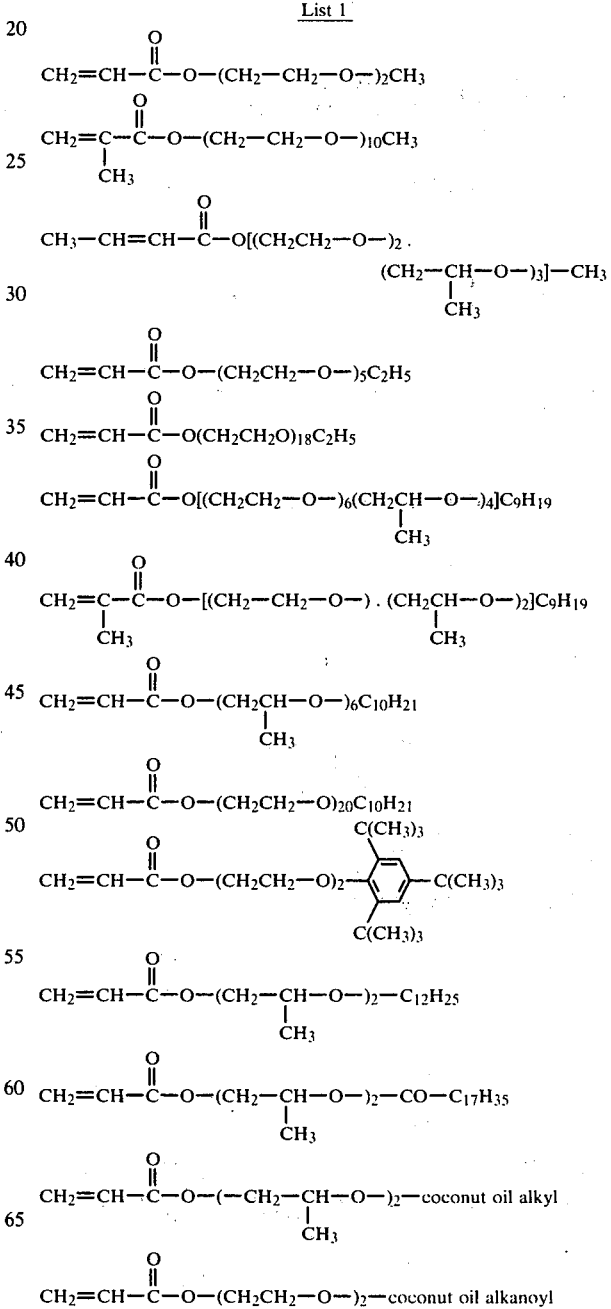

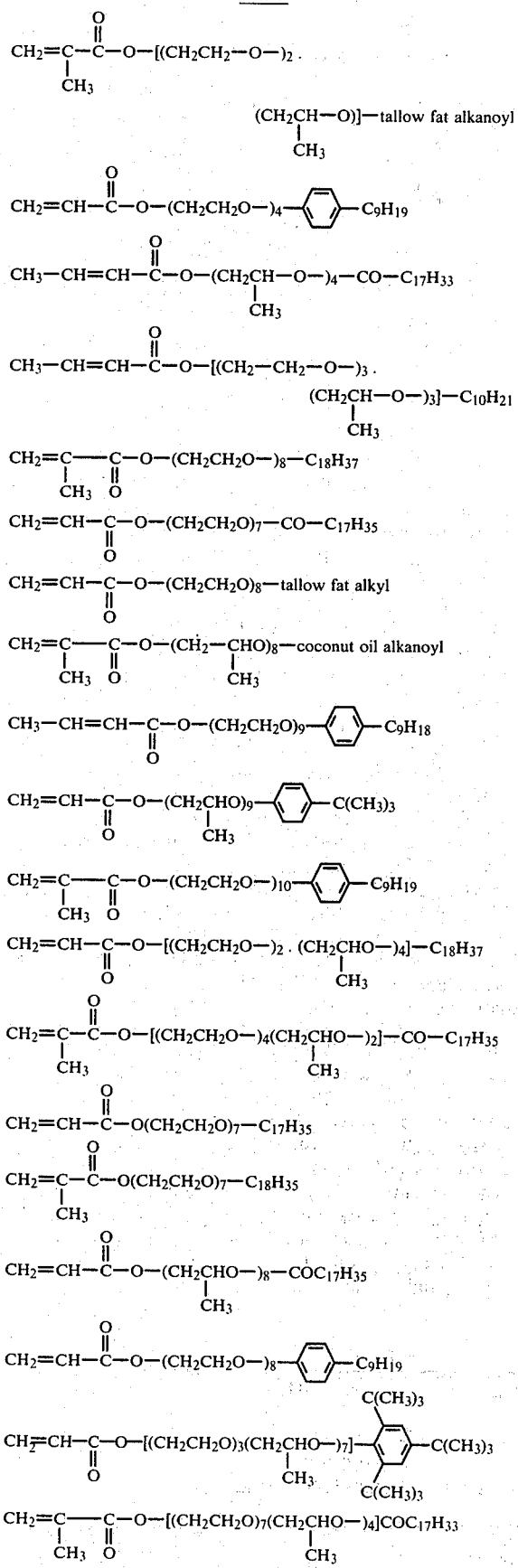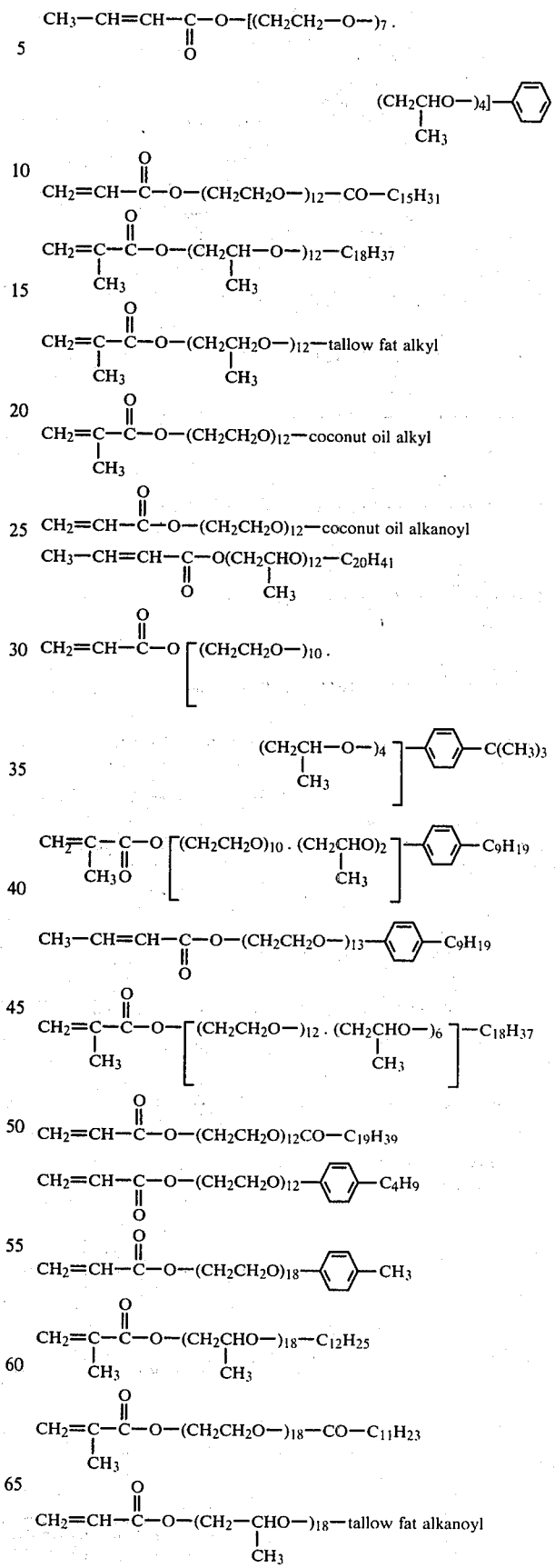

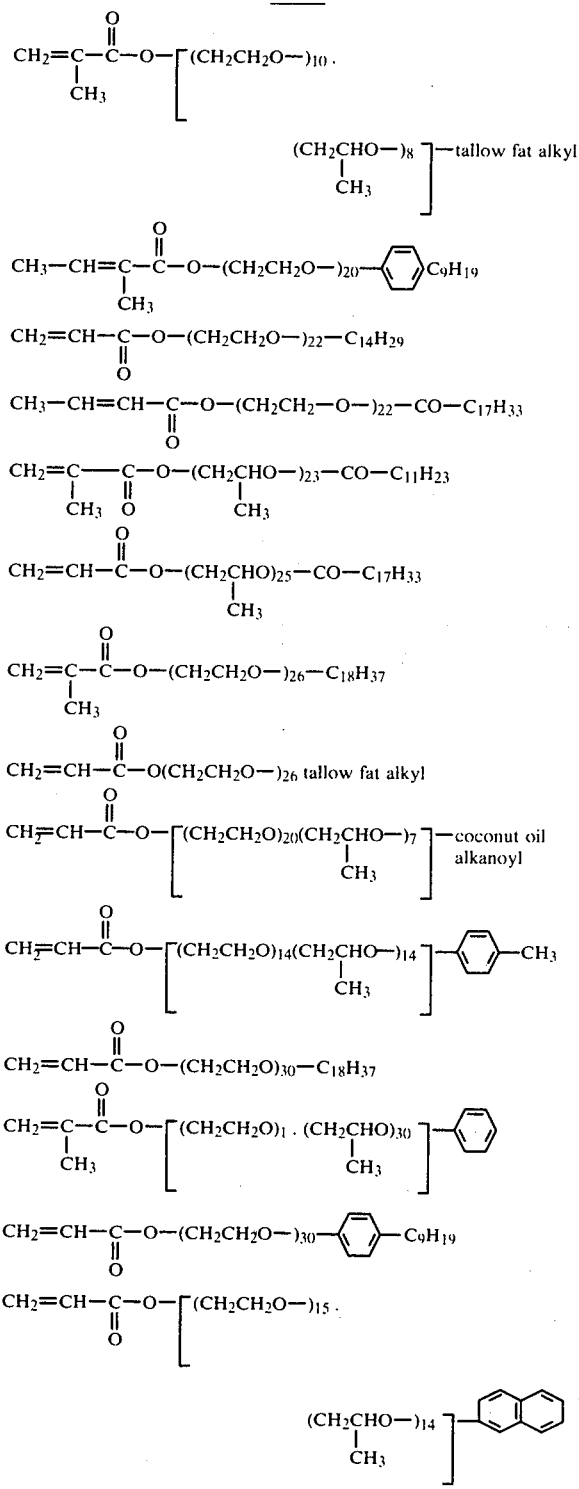

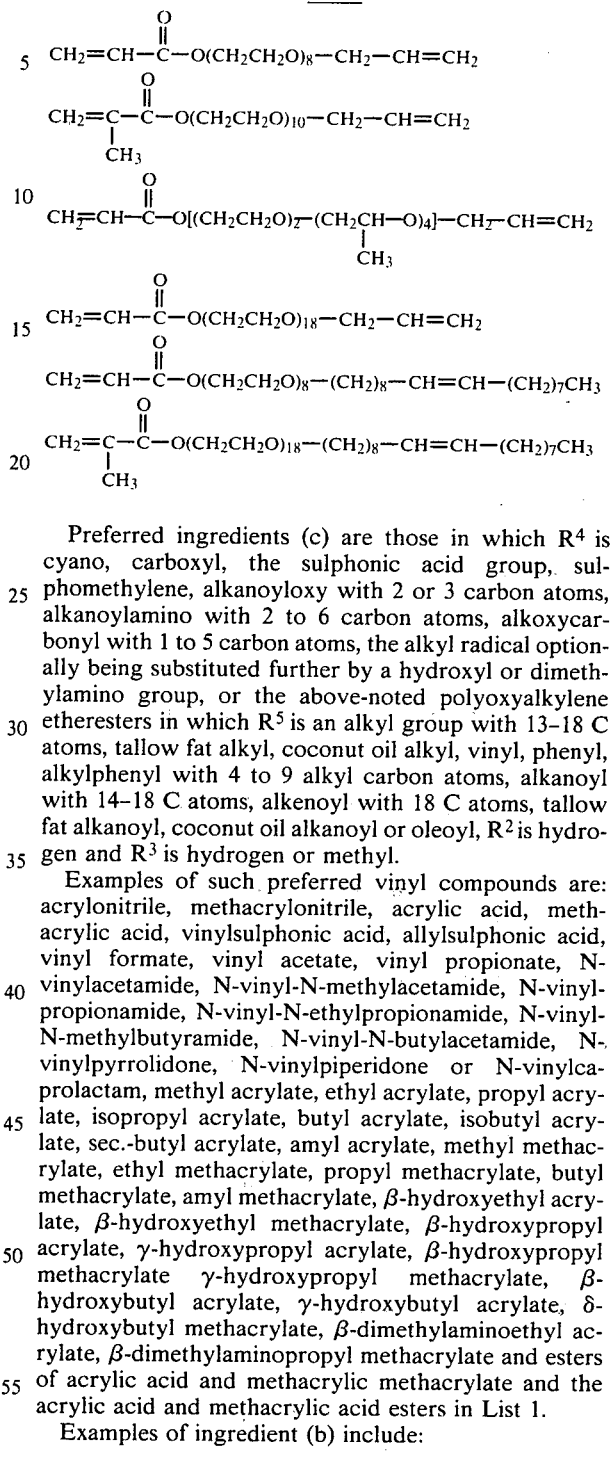

Preferred ingredients (c) are those in which $R^4$ is cyano, carboxyl, the sulphonic acid group, sulphomethylene, alkanoyloxy with 2 or 3 carbon atoms, alkanoylamino with 2 to 6 carbon atoms, alkoxycarbonyl with 1 to 5 carbon atoms, the alkyl radical optionally being substituted further by a hydroxyl or dimethylamino group, or the above-noted polyoxyalkylene etheresters in which $R^5$ is an alkyl group with 13–18 C atoms, tallow fat alkyl, coconut oil alkyl, vinyl, phenyl, alkylphenyl with 4 to 9 alkyl carbon atoms, alkanoyl with 14–18 C atoms, alkenoyl with 18 C atoms, tallow fat alkanoyl, coconut oil alkanoyl or oleoyl, $R^2$ is hydrogen and $R^3$ is hydrogen or methyl.

Examples of such preferred vinyl compounds are: acrylonitrile, methacrylonitrile, acrylic acid, methacrylic acid, vinylsulphonic acid, allylsulphonic acid, vinyl formate, vinyl acetate, vinyl propionate, N-vinylacetamide, N-vinyl-N-methylacetamide, N-vinylpropionamide, N-vinyl-N-ethylpropionamide, N-vinyl-N-methylbutyramide, N-vinyl-N-butylacetamide, N-vinylpyrrolidone, N-vinylpiperidone or N-vinylcaprolactam, methyl acrylate, ethyl acrylate, propyl acrylate, isopropyl acrylate, butyl acrylate, isobutyl acrylate, sec.-butyl acrylate, amyl acrylate, methyl methacrylate, ethyl methacrylate, propyl methacrylate, butyl methacrylate, amyl methacrylate, β-hydroxyethyl acrylate, β-hydroxyethyl methacrylate, β-hydroxypropyl acrylate, γ-hydroxypropyl acrylate, β-hydroxypropyl methacrylate γ-hydroxypropyl methacrylate, β-hydroxybutyl acrylate, γ-hydroxybutyl acrylate, δ-hydroxybutyl methacrylate, β-dimethylaminoethyl acrylate, β-dimethylaminopropyl methacrylate and esters of acrylic acid and methacrylic methacrylate and the acrylic acid and methacrylic acid esters in List 1.

Examples of ingredient (b) include:

TABLE 1

Maleic acid esters and fumaric acid esters having the formula

CH—CO—OR
‖
CH—CO—$R^6$ wherein $R^6$ and R are the following pairs:

| $R^6$ | R |
|---|---|
| —O—(CH$_2$—CH$_2$—O—)$_2$CH$_3$ | —CH(CH$_3$)—CH$_2$—OH |
| —O—(CH$_2$—CH$_2$—O—)$_{10}$CH$_3$ | —CH$_2$—CH$_2$OH |

TABLE 1-continued

Maleic acid esters and fumaric acid esters having the formula $$\begin{array}{c} CH-CO-OR \\ \| \\ CH-CO-R^6 \end{array}$$

wherein $R^6$ and R are the following pairs:

| $R^6$ | R |
|---|---|
| $-O-[(CH_2-CH_2-O-)_2 \cdot (CH_2-CH(CH_3)-O-)_3]-CH_3$ | $-CH_2-CH_2OH$ |
| $-O-(CH_2CH_2-O-)_5C_2H_5$ | Na |
| $-O(CH_2CH_2O)_{18}C_2H_5$ | $-CH_2-CH_2OH$ |
| $-O-(CH_2-CH_2-O-)_2C_4H_9(n)$ | K |
| $-O-[(CH_2-CH_2-O-)_2 \cdot (CH_2-CH(CH_3)-O)_2]C_4H_9(iso)$ | $-CH(CH_3)-CH_2OH$ |
| $-O-(CH_2-CH(CH_3)-O-)_4-C_6H_{13}$ | H |
| $-O-(CH_2-CH_2O)_{15}C_4H_9(n)$ | $NH_4$ |
| $-O-(CH_2-CH_2-O-)_8C_8H_{17}$ | $-CH(CH_3)CH_2OH$ |
| $-O-[(CH_2CH_2-O-)_6(CH_2CH(CH_3)-O-)_4]C_9H_{19}$ | $-CH_2-CH_2OH$ |
| $-O-[(CH_2-CH_2-O-)_1 \cdot (CH_2CH(CH_3)-O-)_2]C_9H_{19}$ | H |
| $-O-(CH_2CH_2-O-)_6C_{10}H_{21}$ | Na |
| $-O-(CH_2CH(CH_3)-O-)_6C_{10}H_{21}$ | $-CH(CH_3)-CH_2-OH$ |
| $-O-(CH_2CH_2-O)_{20}C_{10}H_{21}$ | $-CH_2-CH_2-OH$ |
|  | $-CH(CH_3)-CH_2OH$ |
| $-O-(CH_2CH_2-O)_2-$ 2,4,6-tri-tert-butylphenyl | |
| $-O-(CH_2CH_2-O-)_2-C_{18}H_{36}$ | $-CH_2-CH_2-OH$ |
| $-O-(CH_2CH_2-O-)_2-CO-C_{11}H_{23}$ | $-CH(CH_3)-CH_2OH$ |
| $-O-(CH_2-CH(CH_3)-O-)_2-CO-C_{15}H_{31}$ | K |
| $-O-(CH_2-CH(CH_3)-O-)_2-C_{12}H_{25}$ | $-CH(CH_3)-CH_2OH$ |
| $-O-(CH_2-CH(CH_3)-O-)_2-CO-C_{17}H_{35}$ | $-CH_2-CH_2-OH$ |
| $-O-(CH_2-CH(CH_3)-O-)_2-C_6H_4-C(CH_3)_3$ | H |
| $-O-(CH_2CH_2O-)_2-$ tallow fat alkyl | $-CH(CH_3)-CH_2OH$ |
| $-O-(-CH_2-CH(CH_3)-O-)_2-$ coconut oil alkyl | $-CH_2-CH_2-OH$ |
| $-O-(CH_2CH_2-O-)_2-$ coconut oil alkanoyl | Na |
| $-O-[(CH_2CH_2-O-)_2 \cdot (CH_2CH(CH_3)-O)]-$ tallow fat alkanoyl | $-CH_2-CH_2-OH$ |
| $-O(CH_2CH_2O-)_4-C_{18}H_{37}$ | $-CH(CH_3)CH_2OH$ |
|  | $-CH_2CH_2OH$ |
| $-O-(CH_2CH_2-O-)_4-C_6H_5$ | H |
| $-O-(CH_2CH_2O-)_6-C_6H_5$ | H |
| $-O-(CH_2CH_2O-)_4-C_6H_4-C_9H_{19}$ | |

TABLE 1-continued

Maleic acid esters and fumaric acid esters having the formula $$\begin{array}{l}CH-CO-OR\\\|\\CH-CO-R^6\end{array}$$

wherein $R^6$ and R are the following pairs:

| $R^6$ | R |
|---|---|
| $-O-(CH_2CH-O-)_4-CO-C_{17}H_{33}$<br>         $\|$<br>         $CH_3$ | $-CH(CH_3)-CH_2OH$ |
| $-O-(CH_2CH_2O)_7-C_{18}H_{37}$ | $-CH_2-CH_2-OH$ |
| $-O-(CH_2CH_2O-)_7-CO-C_9H_{19}$ | $-CH_2-CH_2-OH$ |
| $-O-[(CH_2-CH_2-O-)_3 \cdot (CH_2CH-O-)_3-]-C_{10}H_{21}$<br>                           $\|$<br>                           $CH_3$ | $-CH(CH_3)-CH_2-OH$ |
| $-O-[(CH_2CH_2O-)_2 \cdot (CH_2CHO-)_4-]-C_{18}H_{37}$<br>                           $\|$<br>                       $CH_3$ | $-CH_2CH_2-OH$ |
| $-O-[(CH_2CH_2O-)_4(CH_2CHO-)_2-]-CO-C_{17}H_{35}$<br>                           $\|$<br>                         $CH_3$ | $-CH_2-CH_2-OH$ |
| $-O-[(CH_2CH_2O-)_4(CH_2CHO-)_3-]-CO-C_{15}H_{31}$<br>                           $\|$<br>                         $CH_3$ | $NH_4$ |
| $-O-(CH_2CH_2O-)_7-C_{15}H_{31}$ | $-CH(CH_3)-CH_2OH$ |
| $-O(CH_2CH_2O)_7-C_{17}H_{35}$ | H |
| $-O(CH_2CH_2O)_7-C_{18}H_{35}$ | $-CH_2-CH_2-OH$ |
| $-O-(CH_2CHO-)_8-COC_9H_{19}$<br>          $\|$<br>          $CH_3$ | $-CH(CH_3)-CH_2OH$ |
| $-O-(CH_2CH_2O-)_8-$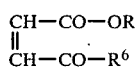$-C_9H_{19}$ | $-CH(CH_3)CH_2OH$ |
| $-O-(CH_2CHO-)_8-CO-C_{13}H_{27}$<br>          $\|$<br>          $CH_3$ | Na |
| $-O-(CH_2CH_2O-)_8-C_{18}H_{37}$ | $-CH_2-CH_2-OH$ |
| $-O-(CH_2CH_2O)_7-CO-C_{17}H_{35}$ | $-CH(CH_3)-CH_2OH$ |
| $-O-(CH_2CH_2O)_8-$ tallow fat alkyl | $-CH(CH_3)-CH_2OH$ |
| $-O-(CH_2-CHO)_8-$ coconut oil alkanoyl<br>         $\|$<br>         $CH_3$ | H |
| $-O-(CH_2CH_2O)_9-$⟨phenyl⟩$-C_9H_{19}$ | H |
| $-O-(CH_2CHO)_9-$⟨phenyl with $CH(CH_3)_2$ substituents⟩$-CH(CH_3)_2$<br>         $\|$<br>         $CH_3$  $CH(CH_3)_2$ | $-CH_2CH_2-OH$ |
| $-O-(CH_2CHO)_9-$⟨phenyl⟩$-C(CH_3)_3$<br>         $\|$<br>         $CH_3$ | Na |
| $-O-(CH_2CH_2O-)_{10}-$⟨phenyl⟩$-C_9H_{19}$ | $-CH(CH_3)CH_2OH$ |
| $-O-(CH_2CH_2O-)_{10}-C_{18}H_{37}$ | $-CH_2-CH_2OH$ |
|  | $-CH_2-CH_2OH$ |
| $-O-[(CH_2CH_2O)_3(CH_2CHO-)_7-]$⟨phenyl with three $C(CH_3)_3$ substituents⟩<br>                       $\|$<br>                       $CH_3$ |  |
| $-O-[(CH_2CH_2O)_7(CH_2CHO-)_4]COC_{17}H_{33}$<br>                       $\|$<br>                       $CH_3$ | $-CH_2-CH_2OH$ |
| $-O-(CH_2CH_2O-)_{11}-$⟨phenyl⟩$-C(CH_3)_3$ | $CH(CH_3)CH_2OH$ |

TABLE 1-continued

Maleic acid esters and fumaric acid esters having the formula $$\begin{array}{l}CH-CO-OR\\ \parallel\\ CH-CO-R^6\end{array}$$

wherein $R^6$ and R are the following pairs:

| $R^6$ | R |
|---|---|
| $-O-[(CH_2CH_2-O-)_7 \cdot (CH_2CHO-)_4]-C_6H_5$ with $CH_3$ branch | $-CH(CH_3)-CH_2OH$ |
| $-O-(CH_2CH_2O-)_{12}-C_{12}H_{25}$ | H |
| $-O-(CH_2CH_2O-)_{12}-C_6H_5$ | K |
| $-O(CH_2CHO)_{12}-CO-C_{11}H_{23}$ with $CH_3$ branch | $-CH_2-CH_2OH$ |
| $-O(CH_2CH_2O)_{12}-C_{16}H_{33}$ | $-CH_2-CH_2-OH$ |
| $-O-(CH_2CH_2O-)_{12}C_{18}H_{37}$ | H |
| $-O-(CH_2CH_2O-)_{12}-CO-C_{15}H_{31}$ | $-CH_2-CH_2OH$ |
| $-O-(CH_2CHO-)_{12}-COC_{15}H_{31}$ with $CH_3$ branch | $-CH(CH_3)-CH_2OH$ |
| $-O-(CH_2CH-O-)_{12}-C_{18}H_{37}$ with $CH_3$ branch | $-CH_2-CH_2OH$ |
| $-O-[(CH_2CH_2O)_7 \cdot (CH_2CHO-)_5]-COC_{17}H_{35}$ with $CH_3$ branch | H |
| $-O-(CH_2CH_2O-)_{12}-$ tallow fat alkyl | H |
| $-O-(CH_2CH_2O)_{12}-$ coconut oil alkyl | $-CH(CH_3)CH_2OH$ |
| $-O-(CH_2CH_2O)_{12}-$ coconut oil alkanoyl | $-CH_2-CH_2-OH$ |
| $-O(CH_2CH_2O)_{12}-COC_{17}H_{33}$ | $-CH(CH_3)CH_2OH$ |
| $-O(CH_2CHO)_{12}-C_{20}H_{41}$ with $CH_3$ branch | $NH_4$ |
| $-O[(CH_2CH_2O-)_{10} \cdot (CH_2CH-O-)_4]-C_6H_4-C(CH_3)_3$ with $CH_3$ branch | $-CH_2-CH_2-OH$ |
| $-O[(CH_2CH_2)_{10} \cdot (CH_2CHO)_2]-C_6H_4-C_9H_{19}$ with $CH_3$ branch | $-CH(CH_3)-CH_2-OH$ |
| $-O-(CH_2CH_2O-)_{13}-C_6H_5$ | H |
| $-O-(CH_2CH_2O-)_{13}-C_6H_4-C_9H_{19}$ | $-CH_2-CH_2-OH$ |
| $-O-[(CH_2CH_2O-)_{12} \cdot (CH_2CHO-)_4]-C_{18}H_{37}$ with $CH_3$ branch | $-CH_2-CH_2-OH$ |
| $-O-(CH_2CH_2O-)_{14}-C_6H_4-C_9H_{19}$ | Na |
| $-O-[(CH_2CH_2O-)_{12} \cdot (CH_2CHO-)_6]-C_{18}H_{37}$ with $CH_3$ branch | $-CH(CH_3)-CH_2-OH$ |
| $-O-(CH_2CH_2O)_{12}CO-C_{19}H_{39}$ | $-CH(CH_3)-CH_2-OH$ |
| | $-CH_2-CH_2-OH$ |
| $-O-(CH_2CH_2O)_{12}-C_6H_4-C_4H_9$ | H |
| $-O-(CH_2CHO)_{12}-C_6H_4-C_9H_{19}$ with $CH_3$ branch | |
| | $-CH_2-CH_2-OH$ |
| $-O-(CH_2CH_2O)_{18}-C_6H_4-CH_3$ | |

TABLE 1-continued

Maleic acid esters and fumaric acid esters having the formula $$\begin{array}{l} CH-CO-OR \\ \| \\ CH-CO-R^6 \end{array}$$

wherein $R^6$ and $R$ are the following pairs:

| $R^6$ | R |
|---|---|
| $-O-(CH_2CHO-)_{18}-C_{12}H_{25}$ (with $CH_3$ branch) | $-CH_2-CH_2-OH$ |
| $-O-(CH_2CH_2O-)_{18}-CO-C_{11}H_{23}$ | K |
| $-O(CH_2CH_2O)_{18}-CO-C_{17}H_{35}$ | $-CH(CH_3)-CH_2-OH$ |
| $-O-(CH_2-CHO-)_{18}-$ tallow fat alkanoyl (with $CH_3$ branch) | $-CH_2-CH_2-OH$ |
| $-O-[(CH_2CH_2O-)_{10} \cdot (CH_2CHO-)_8]$ tallow fat alkyl (with $CH_3$ branch) | H |
| $-O[(CH_2CH_2O)_7 \cdot (CH_2CHO)_{11}]-\mathrm{C_6H_4}-C(CH_3)_3$ (with $CH_3$ branch) | $-CH(CH_3)-CH_2-OH$ |
| $-O-(CH_2CH_2O-)_{20}-\mathrm{C_6H_4}-C_9H_{19}$ | $-CH_2-CH_2-OH$ |
| $-O-(CH_2CH_2O-)_{22}-C_{14}H_{29}$ | $-CH_2-CH_2-OH$ |
| $-O-(CH_2CH_2-O-)_{22}-CO-C_{17}H_{33}$ | $-CH(CH_3)-CH_2-OH$ |
| $-O-(CH_2CHO-)_{23}-CO-C_{11}H_{23}$ (with $CH_3$ branch) | $-CH(CH_3)-CH_2OH$ |
| $-O-(CH_2CH_2O-)_{25}C_{18}H_{37}$ | $-CH(CH_3)-CH_2-OH$ |
| $-O-(CH_2CH_2O-)_{25}-COC_{17}H_{35}$ | $-CH_2-CH_2-OH$ |
| $-O-(CH_2CHO)_{25}-CO-C_{17}H_{33}$ (with $CH_3$ branch) | H |
| $-O-(CH_2CH_2O)_{26}-C_{18}H_{37}$ | K |
| $-O(CH_2CH_2O-)_{26}$ tallow fat alkanoyl | $CH(CH_3)CH_2OH$ |
|  | $-CH_2-CH_2-OH$ |
| $-O-[(CH_2CH_2O)_{20}(CH_2CHO-)_7]-$coconut oil alkanoyl (with $CH_3$ branch) | $NH_4$ |
| $-O-[(CH_2CH_2O)_{14}(CH_2CHO-)_{14}]-\mathrm{C_6H_4}-CH_3$ (with $CH_3$ branch) | $-CH_2-CH_2-OH$ |
| $-O-[(CH_2CH_2O)_{20} \cdot (CH_2CHO)_9]-CO-C_9H_{19}$ (with $CH_3$ branch) | $-CH_2-CH_2-OH$ |
| $-O-(CH_2CH_2O)_{29}-COC_{15}H_{31}$ | $-CH(CH_3)CH_2OH$ |
| $-O-(CH_2CHO-)_{29}-COC_{17}H_{35}$ (with $CH_3$ branch) | $-CH_2-CH_2-OH$ |
| $-O-(CH_2CH_2O)_{30}-C_{18}H_{37}$ | $-CH(CH_3)-CH_2-OH$ |
| $-O-[(CH_2CH_2O) \cdot (CH_2CHO)_{30}]-\mathrm{C_6H_5}$ (with $CH_3$ branch) | Na |
| $-O-(CH_2CH_2O-)_{30}-\mathrm{C_6H_4}-C_9H_{19}$ | $-CH_2-CH_2-OH$ |
| $-O-(CH_2CH_2O)_{30}-\mathrm{C_6H_4}-C(CH_3)_3$ | $-CH_2-CH_2-OH$ |
| $-O-[(CH_2CH_2O-)_{15} \cdot (CH_2CHO-)_{14}]$-naphthyl (with $CH_3$ branch) |  |

Preferred ingredients (b) are those in which $R^1$ is alkyl with 14 to 18 carbon atoms, tallow fat alkyl, coconut oil alkyl, oleyl, phenyl, alkylphenyl with 4 to 9 alkyl carbon atoms, alkanoyl with 14 to 18 carbon atoms, alkenoyl with 18 carbon atoms, tallow fat alkanoyl, coconut oil alkanoyl or oleoyl. Examples of such preferred ingredients are those compounds of Table 1 in which $R^6$ has any of the above-mentioned end groups.

The ingredients (b) can generally be prepared by reaction of maleic anhydride with polyoxyalkylene ether-alcohols having the formula

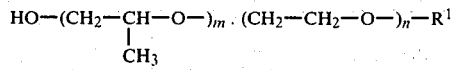

wherein m, n and $R^1$ have the above-mentioned meanings. Examples of such ether-alcohols are those which correspond to the $R^6$ radicals of Table 1. Their reaction with the maleic anhydride is conveniently effected by heating a mixture of equivalent amounts of the starting materials for several hours to from 80° to 120° C. with or without a volatilizable solvent. In general, reaction times of 1 to 9 hours are used. When working at 80° C., the reaction times are in the upper part of the stated time range and when working at 120° C., they are in the lower part of that range. Preferably, the reaction is carried out at 80° to 100° C., in which case 2 to 4 hours are all that are needed for the reaction. This reaction gives half-esters which correspond to ingredient (b) wherein R is hydrogen.

From these half-esters, compounds in which R is ammonium, sodium or potassium, can be manufactured by neutralizing with ammonia, sodium hydroxide or sodium carbonate, or potassium hydroxide or potassium carbonate. Those ingredients (b) in which R is —$CH_2CH_2OH$ or —$CH(CH_3)CH_2OH$, can be manufactured by reacting the half-esters with ethylene oxide or propylene oxide. This reaction is advantageously carried out at 60°–150° C., preferably at 80°–120° C. for from 2–12 hours. This reaction is preferably carried out without a solvent.

The alkanols which correspond to the $R^6$ radicals of Table 1 can be obtained by reacting ethylene oxide or propylene oxide, or ethylene oxide and propylene oxide, with the appropriate fatty alcohols, phenol, alkyl-phenols or fatty acids, it being a simple matter to vary the degree of alkoxylation between 1 and 30 by controlling the reactant proportions. Reaction products of stearyl alcohol, tallow fat alcohol, coconut oil alcohol, oleyl alcohol, isotridecyl alcohol, phenol, nonylphenol, stearic acid, tallow fatty acid, oleic acid and coconut oil acid with 1–30 mol of ethylene oxide, propylene oxide, or ethylene oxide and propylene oxide are preferred.

The examples of embodiments given below illustrate typical procedures for the manufacture of the copolymers according to the present invention and for their use. In these polymerization all the monomers are consumed and all copolymer viscosities measured at 25° C.

EXAMPLE 1

600 ml of deionized water are initially introduced into a 2 l. polymerization vessel equipped with a stirrer, thermometer, gas inlet tube, dropping funnel and heating bath, and the following monomers are then introduced at room temperature while stirring the mixture and passing a slight stream of nitrogen through it:

70 g of acrylamide and
30 g of a maleic acid di-ester having the formula

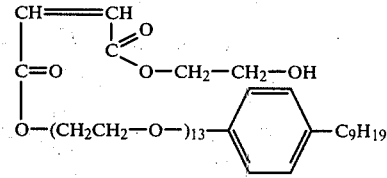

when the mixture is essentially uniform, there are added
0.2 g of dibutylamine hydrochloride and
0.1 g of

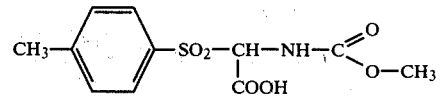

and the temperature of the reaction mixture is brought to 40° C. by means of the heating bath. A solution of 0.5 g of $(NH_4)_2S_2O_8$ in 25.0 ml of water is now added dropwise over the course of 1 hour, stirring continuously. 15 to 20 minutes after the start of the dropwise addition, the polymerization commences, with a rise in temperature and in viscosity. A maximum temperature of 49° C. is reached.

After the temperature subsides, the mixture is stirred for a further 2 hours at 80° C. The highly viscous polymer mass that results is now diluted to a polymer content of 4% by adding 1,630 ml of water with stirring. A solution having a viscosity of 8,813 cp at 25° C. is obtained, and can be directed added to a dye bath without further treatment and without purification.

The monomer combinations listed in Table II are polymerized in the same apparatus and using the same polymerization technique, except for the temperature differences noted as used to initiate polymerization. All the compounds copolymerized with the acrylamide are maleic acid derivatives.

TABLE II

| Example No. | Amount of acrylamide [g] | Compound of the formula $R^6O-C(=O)-CH=CH-C(=O)-OR$ | and amount [g] | Polymerisation temperature [°C.] | Viscosity of a 4% strength solution [cp] |
|---|---|---|---|---|---|
| 2 | 70 | $R^6$:—$O(CH_2CH_2-O)_{12}$—〈phenyl〉—$C_9H_{19}$<br>R:$CH_2CH_2OH$ | 30 | 40 | 9,316 |
| 3 | 70 | $R^6$:—$O(CH_2CH_2O)_{10}$—〈phenyl〉—$C_9H_{19}$<br>R:—$CH_2$—$CH_2$—OH | 30 | 40 | 8,158 |
| 4 | 70 | $R^6$:—$O(CH_2CH_2O)_8$—〈phenyl〉—$C_9H_{19}$ | 30 | 40 | 9,418 |

TABLE II-continued

| Example No. | Amount of acrylamide [g] | Compound of the formula $R^6\text{-OC(O)-CH=CH-C(O)-OR}$ | and amount [g] | Polymerisation temperature [°C] | Viscosity of a 4% strength solution [cp] |
|---|---|---|---|---|---|
| 5 | 70 | R: —CH$_2$CH$_2$OH<br>R$^6$: —O(CH$_2$CH$_2$O)$_6$—C$_6$H$_4$—C$_9$H$_{19}$ | 30 | 40 | 7,981 |
| 6 | 70 | R: —CH$_2$CH$_2$OH<br>R$^6$: —O(CH$_2$CH$_2$O)$_4$—C$_6$H$_4$—C$_9$H$_{19}$ | 30 | 40 | 8,116 |
| 7 | 70 | R: —CH$_2$CH$_2$OH<br>R$^6$: —O(CH$_2$CH$_2$O)$_{13}$—C$_6$H$_4$—C$_9$H$_{19}$ | 30 | 40 | 5,327 |
| 8 | 70 | R: NH$_4$<br>R$^6$: —O(CH$_2$CH$_2$O)$_{13}$—C$_6$H$_4$—C$_9$H$_{19}$ | 30 | 50 | 2,325 |
| 9 | 70 | R: H<br>R$^6$: —O(CH$_2$CH$_2$O)$_{30}$—C$_6$H$_4$—C$_9$H$_{19}$ | 30 | 50 | 10,312 |
| 10 | 30 | R: —CH$_2$CH$_2$OH<br>R$^6$: —O(CH$_2$CH$_2$O)$_{10}$—C$_6$H$_4$—C$_9$H$_{19}$ | 70 | 50 | 4,528 |
| 11 | 66.6 | R: Na<br>R$^6$: —O(CH$_2$CH$_2$O)$_{13}$—C$_6$H$_4$—C$_9$H$_{19}$ | 33.4 | 50 | 1,208 |
| 12 | 53.4 | R: H<br>R$^6$: —O(CH$_2$CH$_2$—O—)$_{13}$—C$_6$H$_4$—C$_9$H$_{19}$ | 46.6 | 50 | 2,325 |
| 13 | 70 | R: H<br>R$^6$: —O(CH$_2$CH$_2$O)$_7$—(CH$_2$)$_{17}$—CH$_3$<br>R: H | 30 | 50 | 856 |

EXAMPLE 14

600 ml of deionized water are initially introduced into a 2 l. polymerization vessel equipped with a stirrer, thermometer, gas inlet tube, dropping funnel and heating bath, and the following monomers are then introduced, while stirring the mixture and passing a slight stream of nitrogen through it:

70 g of methacrylamide and
30 g of the maleic acid ester-salt having the formula

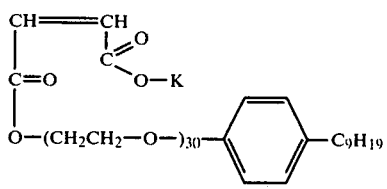

After the mixture appears homogeneous there is added 0.2 g of

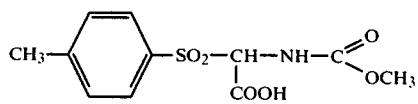

and the temperature of the reaction mixture is brought to 50° C. by means of the heating bath. A solution of 0.5 g of (NH$_4$)$_2$S$_2$O$_8$ in 25.0 ml of water is now added dropwise over the course of 1 hour, stirring continuously.

Several minutes after the start of the dropwise addition, the polymerization commences, with a rise in temperature and in viscosity. A maximum temperature of 54° C. is reached.

After completion of the reaction, the mixture is stirred for a further 2 hours at 80° C. The highly viscous polymer mass is now diluted to a polymer content of 4% by adding 1,630 ml of water with stirring.

The solution thus obtained has a viscosity of 2,810 cp.

EXAMPLE 15

As in Example 1, 600 ml of deionized water are initially introduced into a 2 l. polymerization vessel equipped with a stirrer, thermometer, gas inlet tube, dropping funnel and heating bath. The following monomers are then introduced, while stirring the mixture and passing a slight stream of nitrogen through it:

70 g of acrylamide and
30 g of the maleic acid half-ester

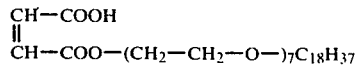

When the mixture becomes clear there are added
0.2 g of dibutylamine hydrochloride and
0.1 g of

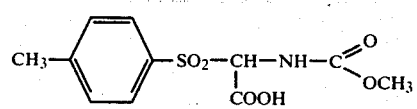

and the temperature of the reaction mixture is brought to 50° C. by means of the heating bath. A solution of 0.5 g of (NH$_4$)$_2$S$_2$O$_8$ in 25.0 ml of water is now added dropwise over the course of 1 hour, while stirring. About 15 minutes after the start of the dropwise addition, the polymerization commences, with a rise in temperature and in viscosity. A maximum temperature of 63° C. is reached. After the mixture begins to cool down it is stirred for a further hour at 80° C. The highly viscous polymer mass is now diluted to 6% strength by adding about 1 l. of water, while stirring.

A solution which is clear at room temperature and which has a viscosity of 10,056 cp and a cloud point of 68° C. is obtained.

Using the procedure of Example 15, both in respect of the apparatus and of the experimental technique, the combinations listed in Table III were polymerized instead of the monomer combination employed in Example 15. In all cases maleic acid derivatives were used and water-soluble, viscous polymer solutions were obtained:

TABLE III

Maleic Ester of the Formula $$\begin{array}{c} CH-C\underset{OR}{\overset{O}{\diagdown}}R^6 \\ \| \\ CH-C\underset{OR}{\overset{O}{\diagdown}} \end{array}$$

| Example No. | Acrylamide | Maleic Ester | Viscosity of a 6% strength solution |
|---|---|---|---|
| 16 | 70 g | 30 g R$^6$: —O(CH$_2$—CH$_2$—O)$_4$—⌬—C$_9$H$_{19}$<br>R:H | 8301 cp |
| 17 | 70 g | 30 g R$^6$: —O(CH$_2$—CH$_2$—O)$_6$—⌬<br>R:H | 6783 cp |
| 18 | 70 g | 30 g R$^6$: —O(CH$_2$—CH$_2$—O)$_8$—⌬—C$_9$H$_{19}$<br>R:H | 9003 cp |
| 19 | 70 g | 30 g R$^6$: —O(CH$_2$—CH$_2$—O)$_{10}$—⌬—C$_9$H$_{19}$<br>R:H | 1150 cp |
| 20 | 70 g | 30 g R$^6$: —O(CH$_2$—CH$_2$—O)$_{11}$—⌬—C(CH$_3$)$_3$<br>R:H | 7318 cp |
| 21 | 70 g | 30 g R$^6$: —O(CH$_2$—CH$_2$—O)$_{12}$—⌬<br>R:H | 7018 cp |
| 22 | 70 g | 30 g R$^6$: —O(CH$_2$—CH$_2$—O)$_{13}$—⌬—C$_9$H$_{19}$<br>R:H | 5931 cp |
| 23 | 70 g | 30 g R$^6$: —O(CH$_2$—CH$_2$—O)$_{20}$—⌬—C$_9$H$_{19}$<br>R:H | 11,041 cp |
| 24 | 70 g | 30 g R$^6$: —O(CH$_2$—CH$_2$—O)$_{30}$—⌬—C(CH$_3$)$_3$<br>R:H | 8752 cp |
| 25 | 70 g | 30 g R$^6$: —O(CH$_2$—CH$_2$—O)$_{13}$—⌬—C$_9$H$_{19}$<br>R:—CH$_2$—CH$_2$—OH | 6914 cp |
| 26 | 70 g | 30 g R$^6$: —O(CH$_2$—CH$_2$—O)$_{13}$—⌬<br>R:—CH—CH$_2$—OH<br>   $\|$<br>   CH$_3$ | 9316 cp |
| 27 | 70 g | 30 g R$^6$: —O(CH$_2$—CH$_2$—O)$_{13}$—⌬—C$_9$H$_{19}$<br>R:NH$_4$ | 10,831 cp |
| 28 | 70 g | 30 g R$^6$: —O(CH$_2$—CH$_2$—O)$_{13}$—⌬—C$_9$H$_{19}$<br>R:Na | 8442 cp |
| 29 | 70 g | 30 g R$^6$: —O(CH$_2$—CH$_2$—O)$_{13}$—⌬<br>R:K | 5961 cp |

TABLE III-continued

Maleic Ester of the Formula $$\begin{array}{c} CH-C{\overset{\displaystyle O}{\underset{\displaystyle O}{\diagup}}}R^6 \\ \| \\ CH-C{\overset{\displaystyle O}{\diagdown}}OR \end{array}$$

| Example No. | Acrylamide | | Viscosity of a 6% strength solution |
|---|---|---|---|
| 30 | 70 g | 30 g $R^6$:—O(CH$_2$—CH$_2$—O)$_4$—(CH$_2$)$_{17}$CH$_3$<br>R:—CH$_2$—CH$_2$—OH | 10148 cp |
| 31 | 70 g | 30 g $R^6$:—O(CH$_2$—CH$_2$—O)$_7$(CH$_2$)$_{17}$—CH$_3$<br>R:H | 8536 cp |
| 32 | 70 g | 30 g $R^6$:—O(CH$_2$—CH$_2$—O)$_8$(CH$_2$)$_{17}$CH$_3$<br>R:Na | 7941 cp |
| 33 | 70 g | 30 g $R^6$:—O(CH$_2$—CH$_2$—O)$_{10}$(CH$_2$)$_{17}$—CH$_3$<br>R:—CH—CH$_2$—OH<br>$\quad\ $\|<br>$\quad\ $CH$_3$ | 9062 cp |
| 34 | 70 g | 30 g $R^6$:—O(CH$_2$CH$_2$—O)$_{12}$(CH$_2$)$_{17}$—CH$_3$<br>R:K | 11,217 cp |
| 35 | 70 g | 30 g $R^6$:—O(CH$_2$—CH$_2$—O)$_{25}$(CH$_2$)$_{17}$—CH$_3$<br>R:H | 9832 cp |
| 36 | 70 g | 30 g $R^6$:—O(CH$_2$—CH$_2$—O)$_7$(CH$_2$)$_{14}$—CH$_3$<br>R:—CH$_2$—CH$_2$—OH | 8321 cp |
| 37 | 70 g | 30 g $R^6$:—O(CH$_2$—CH$_2$—O)$_2$—CH$_3$<br>R:H | 5427 cp |
| 38 | 70 g | 30 g $R^6$:—O(CH$_2$—CH$_2$—O)$_2$—CH$_2$)$_3$CH$_3$<br>R:—CH$_2$—CH$_2$—OH | 6123 cp |
| 39 | 70 g | 30 g $R^6$:—O(CH$_2$—CH$_2$—O)$_{25}$—CO—(CH$_2$)$_{16}$—CH$_3$<br>R:H | 9428 cp |
| 40 | 70 g | 30 g $R^6$:—O(CH$_2$—CH$_2$—O)$_{22}$—CO—(CH$_2$)$_7$CH=<br>$\qquad\qquad\qquad\qquad\qquad$=CH—(CH$_2$)$_7$—CH$_3$<br>R:—CH$_2$—CH$_2$—OH | 7523 cp |
| 41 | 50 g | 50 g $R^6$:—O(CH$_2$CH$_2$—O)$_{13}$—⟨C$_6$H$_4$⟩—C$_9$H$_{19}$<br>R:—CH$_2$—CH$_2$—OH | 8148 cp |
| 42 | 70 g | 30 g $R^6$:—O—[(CH$_2$CH$_2$O—)$_7$ . (CH$_2$CH—O—)$_4$]—⟨C$_6$H$_5$⟩<br>$\qquad\qquad\qquad\qquad\qquad\qquad\quad$\|<br>$\qquad\qquad\qquad\qquad\qquad\quad\ $CH$_3$<br>R:H | 8416 cp |
| 43 | 70 g | 30 g $R^6$:—O[(CH$_2$CH$_2$O—)$_{10}$ . (CH$_2$CH—O—)$_2$]—⟨C$_6$H$_4$⟩—C$_9$H$_{19}$<br>$\qquad\qquad\qquad\qquad\qquad\qquad\quad$\|<br>$\qquad\qquad\qquad\qquad\qquad\quad\ $CH$_3$<br>R:—CH$_2$—CH$_2$—OH | 7936 cp |
| 44 | 70 g | 30 g $R^6$:—O[(CH$_2$CH$_2$O)$_{12}$ . (CH$_2$CHO—)$_4$]C$_{18}$H$_{37}$<br>$\qquad\qquad\qquad\qquad\qquad\qquad\ $\|<br>$\qquad\qquad\qquad\qquad\qquad\ $CH$_3$<br>R:H | 5336 cp |

EXAMPLE 45

A monomer combination of 50 g of acrylamide, 30 g of a compound of the formula

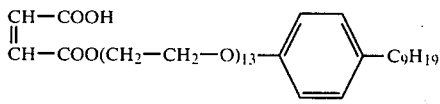

$$\begin{array}{c} CH-COOH \\ \| \\ CH-COO(CH_2-CH_2-O)_{13}-\langle C_6H_4\rangle-C_9H_{19} \end{array}$$

and 20 g of vinylpyrrolidone is polymerised, analogously to Example 15, at 50° C. starting temperature.

The viscosity of the 6% strength aqueous solution of the copolymers obtained is 12,632 cp.

EXAMPLE 46

A monomer combination of 60 g of acrylamide, 10 g of a compound of the formula

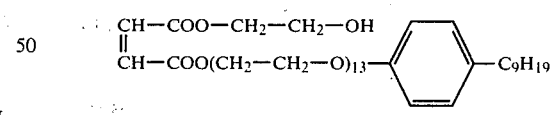

$$\begin{array}{c} CH-COO-CH_2-CH_2-OH \\ \| \\ CH-COO(CH_2-CH_2-O)_{13}-\langle C_6H_4\rangle-C_9H_{19} \end{array}$$

and 30 g of dimethylaminoethyl methacrylate hydrochloride is polymerised, in an analogous manner to that described in Example 15, at 50° C. starting temperature.

The viscosity of the 6% strength solution of the copolymers obtained is 9,934 cp.

EXAMPLE 47

600 ml of deionised water are first introduced into a 2 l polymerisation vessel equipped with a stirrer, thermometer, gas inlet tube, dropping funnel and heating bath, and the following monomers are then introduced, while stirring the mixture and passing a slight stream of nitrogen through it:

50 g of acrylamide,
40 g of a compound of the formula

CH—COO—CH₂—CH₂—OH
‖
CH—COO(—CH₂—CH₂—O)₇(CH₂)₁₇—CH₃ and 10 g of N-vinylmethylacetamide.

Thereafter 0.5 g of azodiisobutyronitrile is added and the temperature of the reaction mixture is brought to 50° C. by means of a heating bath. One ml of a 10% solution of benzoyl peroxide in acetone is then added to cause the polymerization to commence, with a rise in temperature and in viscosity, a maximum temperature of 58° C. being reached.

After completion of the reaction, the mixture is stirred for a further hour at 80° C. The highly viscous polymer mass is now diluted to 6% strength by adding water, while stirring.

A solution which is clear at room temperature and which has a viscosity of 8,664 cp is obtained.

EXAMPLE 48

600 ml of deionized water are first introduced into a 2 l. polymerization vessel equipped with a stirrer, thermometer, gas inlet tube, dropping funnel and heating bath, and the following monomers are then introduced, while stirring the mixture and passing a slight stream of nitrogen through it, and are well dissolved or dispersed while stirring:

40 g of acrylamide,
50 g of

CH—COOH
‖
CH—COO(CH₂—CH₂—O)₃₀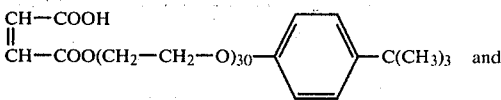—C(CH₃)₃ and 10 g of acrylonitrile.
0.2 g of dibutylamine hydrochloride and
0.1 g of

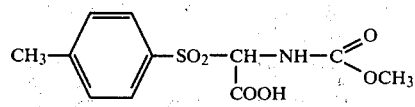

are then added and the temperature of the reaction mixture is brought to 50° C. by means of the heating bath. A solution of 0.5 g of (NH₄)₂S₂O₈ in 25.0 ml of water is now added dropwise over the course of 1 hour, while stirring. About 15 minutes after the start of the dropwise addition, the polymerization commences, with a rise in temperature and in viscosity. A maximum temperature of 75° C. is reached.

After the reaction subsides, the mixture is stirred for a further hour at 80° C. The highly viscous polymer mass is now diluted to a polymer content of 6% by adding water, while stirring.

A viscous opalescent solution having a viscosity of 8,934 cp is obtained.

The monomer combinations listed in Table IV are polymerized in the same apparatus and using the same polymerization technique.

TABLE IV

| Ex. No. | Amounts [g] | Monomers | Viscosity of a 6% strength solution [cp] |
|---|---|---|---|
| 49 | 60 | Acrylamide | 986 |
|  | 20 | CH—COO—CH₂—CH₂—OH<br>‖<br>CH—COO(CH₂—CH₂—O)₂₅(CH₂)₁₇—CH₃ |  |
|  | 20 | Butyl acrylate |  |
| 50 | 60 | Acrylamide | 9,164 |
|  | 20 | CH—COO—CH₂CH₂OH<br>‖<br>CH—COO(CH₂CH₂O)₂₅(CH₂)₁₇CH₃ |  |
|  | 20 | Methyl methacrylate |  |
| 51 | 50 | Methacrylamide | 5,272 |
|  | 30 | Na vinylsulphonate |  |
|  | 20 | CH—COOH<br>‖<br>CH—COO(CH₂—CH₂—O)₁₄—⟨⟩—C₉H₁₉ |  |
| 52 | 50 | Acrylamide | 2,840 |
|  | 20 | CH₂=CH—CH₂—SO₃Na |  |
|  | 30 | CH—COO—CH—CH₂—OH<br>‖     \|<br>    CH₃<br>CH—COO(CH₂—CH₂O)₂₅(CH₂)₁₇CH₃ |  |
| 53 | 50 | Acrylamide | 5,136 |
|  | 20 | CH₂=CH—SO₃Na |  |
|  | 30 | CH—COO CH—CH₂OH<br>‖     \|<br>    CH₃<br>CH—COO(CH₂CH₂O)₂₅(CH₂)₁₇CH₃ |  |
| 54 | 60 | Acrylamide | 6,362 |
|  | 20 | CH₂=C—CH₂—SO₃Na<br>   \|<br>   CH₃ |  |

TABLE IV-continued

| Ex. No. | Amounts [g] | Monomers | Viscosity of a 6% strength solution [cp] |
|---|---|---|---|
|  | 20 | CH—COOH ‖ CH—COO[(CH₂CH₂O—)₁₅ . (CH₂CHO)₁₄—naphthyl] with CH₃ side chain |  |
| 55 | 40 | Methacrylamide | 6,132 |
|  | 40 | Acrylic acid |  |
|  | 20 | CH—COOH ‖ CH—COO(CH₂—CH₂—O)₁₃—phenyl |  |
| 56 | 50 | Maleamic acid CH—CONH₂ ‖ CH—COOH | 5,216 |
|  | 30 | Methacrylic acid |  |
|  | 20 | CH—COO NH₄ ‖ CH—COO[(CH₂CH₂O—)₁₂ . (CH₂CHO—)₆]C₁₈H₃₇ with CH₃ side chain |  |
| 57 | 70 | Acrylamide | 7,364 |
|  | 10 | Crotonic acid |  |
|  | 20 | CH—COO—CH—CH₂—OH ‖ CH₃ CH—COO(CH₂CH₂O)₁₃—phenyl—C₉H₁₉ |  |
| 58 | 50 | Acrylamide | 7,318 |
|  | 25 | Hydroxyethyl acrylate |  |
|  | 25 | A compound of the formula CH—COO—CH₂—CH₂—OH ‖ OH—COO(CH₂CH₂—O—)₁₃—phenyl—C₉H₁₉ |  |

EXAMPLE 59

600 ml of deionised water are first introduced into a 2 l. polymerization vessel equipped with a stirrer, thermometer, gas inlet tube, dropping funnel and heating bath, and the following monomers are then introduced, while stirring the mixture and passing a slight stream of nitrogen through it, and are dissolved or dispersed while stirring:

60 g of acrylamide,
15 g of

CH₂=CH—COO[(CH₂CH₂O—)₈ . (CH₂CHO)₄]—phenyl and with CH₃ side chain 25 g of the maleic acid diester CH—COOCH₂—CH₂—OH ‖ CH—CO—O(CH₂CH₂O—)₁₃—phenyl After dispersion is complete 0.3 g of dibutylamine hydrochloride

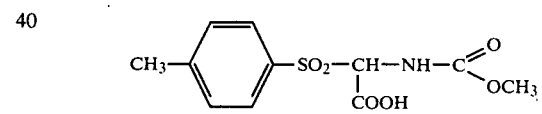

are added and the temperature of the reaction mixture is brought to 70° C. by means of the heating bath. A solution of 0.5 g of (NH₄)₂S₂O₈ in 25.0 ml of water is now added dropwise over the course of 1 hour, while stirring. About 15 minutes after the start of the dropwise addition, the polymerization commences, with a rise in temperature and in viscosity. A maximum temperature of 77° C. is reached.

After the reaction subsides, the mixture is stirred for a further hour at 80° C. The highly viscous polymer mass is now diluted to a polymer content of 6% by adding water, while stirring.

A solution having a viscosity of 984 cp is obtained.

EXAMPLE 60

600 ml of deionized water are first introduced into a 2 l. polymerization vessel equipped with a stirrer, thermometer, gas inlet tube, dropping funnel and heating bath, and the following monomers are then introduced, while stirring the mixture and passing a slight stream of nitrogen through it, and are dissolved or dispersed while stirring:

30 g of crotonic acid amide,
20 g of acrylamide, 20 g of hydroxyethyl methacrylate and 30 g of used in each combination as well as in that of Example 60.

TABLE V

| Ex. No. | Amounts [g] | Monomers | Viscosity of a 6% strength solution [cp] |
|---|---|---|---|
| 61 | 70<br>10 | Acrylamide<br>A compound of the formula<br>$CH_2=C-COO(CH_2CH_2O)_{12}-\phi$<br>$\quad\;\;\;\vert$<br>$\quad\;\;CH_3$ | 6,120 |
|  | 20 | $CH-COOH$<br>$\|\|$<br>$CH-COO(CH_2CH_2O-)_8(CH_2)_{17}CH_3$ |  |
| 62 | 50<br>20 | Acrylamide<br>A compound of the formula<br>$CH_2=CH-CO-O(CH_2CH_2O-) \cdot (CH_2CHO-)-\text{naphthyl}$<br>$\quad\quad\quad\quad\quad\quad\quad\quad\quad\quad\quad\quad\quad\quad\quad\quad\;\;\vert$<br>$\quad\quad\quad\quad\quad\quad\quad\quad\quad\quad\quad\quad\quad\quad\quad\quad CH_3$ | 1,218 |
|  | 30 | $CH-COO-CH-CH_2-OH$<br>$\|\|\quad\quad\quad\quad\;\;\vert$<br>$\quad\quad\quad\quad\quad CH_3$<br>$CH-COO(CH_2CH_2O)_{13}-\phi-C_9H_{19}$ |  |
| 63 | 70<br>10 | Acrylamide<br>A compound of the formula<br>$CH_2=CH-COO(CH_2CH_2O)_8(CH_2)_{17}CH_3$ | 2,418 |
|  | 20 | $CH-COOH$<br>$\|\|$<br>$CH-COO(CH_2CH_2-O)_{13}-\phi$ |  |

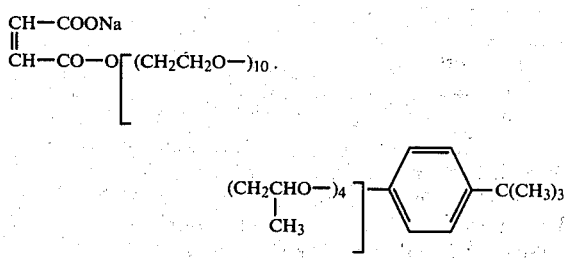

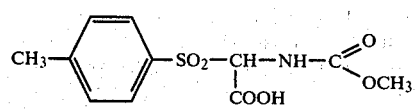

0.2 g of dibutylamine hydrochloride and 0.1 g of a compound of the formula $$CH_3-\phi-SO_2-CH-NH-C\begin{matrix}O\\OCH_3\end{matrix}$$
$$\quad\quad\quad\quad\quad\;\;\vert$$
$$\quad\quad\quad\quad\;\;COOH$$

are then added and the temperature of the reaction mixture is brought to 60° C. by means of the heating bath. A solution of 0.5 g of $(NH_4)_2S_2O_8$ in 25.0 ml of water is now added dropwise over the course of 1 hour, while stirring. About 15 minutes after the start of the dropwise addition, the polymerization commences, with a rise in temperature and in viscosity. A maximum temperature of 79° C. is reached.

After completion of the reaction, the mixture is stirred for a further hour at 80° C. The highly viscous polymer mass is now diluted to a polymer content of 6% by adding water, while stirring.

A solution having a viscosity of 6,324 cp is obtained.

The monomer combinations listed in Table V are polymerized in the same apparatus and using the same polymerization technique. Maleic acid derivatives were

EXAMPLE 64

A dress fabric woven of polyester fibers and viscose fibers mixed in the weight ratio of 70:30 is added, the liquor pick-up being 60% relative to dry fabric weight, with a liquor which contains, per liter of water, 25 g. of the disperse dyestuff C.I. Disperse Blue 165, 25 g. of the disperse dyestuff C.I. Disperse Orange 29 and 15 g of the disperse dyestuff C.I. Disperse Red 184, all in their commercial form, and 15 ml of the 4% strength polymer solution prepared according to Example 1, the liquor having been adjusted to a pH value of 5.5 with 20% strength acetic acid.

The fabric padded in this way is dried at a temperature of 130° C. and is then thermosol-fixed for 60 seconds at a temperature of 210° C. The dyeing is then after-treated by soaping at the boil.

A black dyeing, without grey haze (frosting effect) is thus obtained on the polyester constituent of the fabric.

EXAMPLE 65

A knit fabric of a mixed polyester fibers and viscose (70:30) fiber yarn is padded, the liquor pick-up being 60% relative to dry weight, with a liquor which contains, per liter of water, 50 g of the disperse dyestuff C.I. Disperse Red 183 in its commercial form, and 15 ml of the 4% strength polymer solution prepared according to Example 2, the liquor having been adjusted to a pH value of 5.5 with 20% strength acetic acid.

The fabric padded in this way is dried at a temperature of 130° C. and is then thermosol-treated for 60 seconds at a temperature of 210° C.

The dyeing is then after-treated by soaping at the boil.

A red dyeing, without grey haze (frosting effect) is thus obtained on the polyester constituent of the fabric.

Similar haze-free and frost-free dyeings are obtained with dye baths containing the following dyes and copolymers, following the procedure of Example 64. In each case the dye concentration was 50 grams per liter and the copolymer content of the bath was 0.6 gram per liter.

TABLE VI

| Example No. | Dye | Copolymer |
| --- | --- | --- |
| 66 | C.I. Disperse Red 73 | Example 3 |
| 67 | C.I. Disperse Orange 32 | Example 4 |
| 68 | C.I. Disperse Orange 13 | Example 5 |
| 69 | C.I. Disperse Red 200 | Example 6 |
| 70 | C.I. Disperse Orange 72 | Example 7 |
| 71 | C.I. Disperse Blue 95 | Example 8 |
| 72 | C.I. Disperse Yellow 102 | Example 9 |
| 73 | C.I. Disperse Orange 71 | Example 10 |
| 74 | C.I. Disperse Brown 1 | Example 11 |
| 75 | C.I. Disperse Red 184 | Example 12 |
| 76 | C.I. Disperse Violet 48 | Example 14 |

EXAMPLE 77

A similar dyeing in which the copolymer of Example 13 is correspondingly used with a mixture of 50 grams per liter C.I. Disperse Blue 139, 40 grams per liter of C.I. Disperse Brown 1 and 10 grams per liter of C.I. Disperse Yellow 68, also produces haze- and frost-free results.

The copolymers of Examples 15 through 63 are as effective as those of Examples 1 through 14.

The following Example is by way of comparison with Example 64.

EXAMPLE 78

Example 64 was repeated with the modification, that instead of 15 ml of the 4% strength polymer solution prepared according to Example 1 there were added 15 ml of a 5% aqueous solution of a commercially available polyacrylamide, the 5% aqueous solution having a viscosity of 3000 cp. After the dyeing and aftertreating as described in example 64 there was obtained a black dyeing of the polyester constituent of the fabric showing a distinct grey haze (frosting effect).

EXAMPLE 79

A mixed fabric of polyester fibres and viscose staple fibres mixed in the ratio of 80:20 is padded, the liquor pick-up being 50% relative to dry weight, with a liquor which contains, per litre of water 30 g of the disperse dyestuff C.I. Disperse Orange 13 and 10 g of the direct dyestuff C.I. Direct Orange 18 in their commercial form and nature, and 15 ml of the 4% strength polymer solution prepared according to Example 1 the liquor having been adjusted to a pH value of 5.5 with 20% strength acetic acid.

The fabric padded in this way is dried at a temperature of 130° C. and is then thermosol-treated for 50 seconds at a temperature of 220° C.

Thereafter the fabric is treated for 30 minutes in an aqueous liquor of 95°–100° C. which contains 25 g/l anhydrous sodium sulfate.

The dyeing is then after treated by soaping at the boil, rinsing in warm and then in cold water.

An orange dyeing on the whole fabric without grey haze (frosting effect) was obtained.

EXAMPLE 80

A mixed fabric of polyester fibres and cotton fibres mixed in the ratio of 50:50 is padded, the liquor pick-up being 60% relative to dry weight, with a liquor which contains, per liter of water
 10 g of the disperse dyestuff C.I. Disperse Orange 13,
 6 g of the disperse dyestuff C.I. Disperse Red 73,
 20 g of the disperse dyestuff C.I. Disperse Blue 20,
 8 g of the reactive dyestuff C.I. Reactive Orange 16,
 11 g of the reactive dyestuff C.I. Reactive Yellow 15,
 16 g of the reactive dyestuff C.I. Reactive Black 31,
in their commercial form and nature, and 15 ml of the 4% strength polymer solution prepared according to Example 2, the liquor having been adjusted to a pH value of 5.5 with 20% strength acetic acid.

The fabric padded in this way is dried at a temperature of 125° C. and is then thermosol-treated for 80 seconds at a temperature of 190° C.

The fabric is then padded, the liquor pick-up being 60% relative to dry weight, with a liquor which contains, per liter of water, 10 ml sodium hydroxide of 38° Bé and 200 g anhydrons sodium sulfate. The padded fabric is then steamed at 102° C. for 60 seconds.

The dyeing is then after treated by soaping at the boil, rinsing in warm and then in cold water.

A brown dyeing on the whole fabric without grey haze (frosting effect) was obtained.

EXAMPLE 81

A mixed fabric of polyester fibres and cotton mixed in the ratio of B 40:60 is padded, the liquor pick-up being 60% relative to dry weight, with a liquor which contains, per liter of water,
 20 g of the disperse dyestuff C.I. Disperse Orange 42,
 10 g of the disperse dyestuff C.I. Disperse Red 184,
 18 g of the reactive dyestuff C.I. Reactive Orange 16,
 20 g of the reactive dyestuff C.I. Reactive Red 35,
in their commercial form and nature, and 15 ml of the 4% strength polymer solution prepared according to Example 3, the liquor having been adjusted to a pH value of 5,5 with 20% strength acetic acid.

The fabric padded in this way is dried at a temperature of 130° C. and is then thermosol-treated for 90 seconds at a temperature of 170° C.

The fabric is then padded, the liquor pick-up being 60% relative to dry weight, with a liquor which contains, per liter of water, 20 ml sodium hydroxide of 38° Bé and 250 g anhydrous sodium sulfate. The fabric was then rolled up and stored at room temperature for 4 hours.

The dyeing is then after treated by soaping at the boil, rinsing in warm and then in cold water.

A red dyeing on the whole fabric without grey haze (frosting effect) was obtained.

EXAMPLE 82

Example 81 was repeated with the modification, that instead of 15 ml of the 4% strength polymer solution prepared according to Example 1 there were added 15 ml of a 5% aqueous solution of a commercially available polyacrylamide, the 5% aqueous having a viscosity of 3000 cp.

After the dyeing and aftertreating as described in example 81 there was obtained a red dyeing of the whole fabric showing a distinct grey haze (frosting effect).

EXAMPLE 83

A mixed fabric of polyester fibres and viscose staple fibers mixed in the ratio of 80:20 is padded, the liquor pick-up being 50% relative to dry weight, with a liquor which contains, per liter of water, 25 g of the disperse dyestuff C.I. Disperse Blue 165 and 25 g of the disperse dyestuff C.I. Disperse Orange 29 and 15 g of the disperse dyestuff corresponding to C.I. Disperse Red 184, in their commercial form and nature, and 50 ml of the 4% strength polymer solution prepared according to Example 1, the liquor having been adjusted to a pH value of 5.5 with 20% strength acetic acid.

The fabric padded in this way is dried at a temperature of 130° C. and is then thermosol-treated for 60 seconds at a temperature of 200° C.

The dyeing is then after-treated by soaping at the boil.

A black dyeing, without grey haze (frosting effect) is thus obtained on the polyester constituent of the fabric.

EXAMPLE 84

A mixed fabric of polyester fibres and cotton fibres mixed in the ratio of 60:40 is padded, the liquor pick-up being 55% relative to dry weight, with a liquor which contains, per liter of water, 50 g of the disperse dyestuff C.I. Disperse Red 183 in its commercial form and nature, and 10 ml of the 4% strength polymer solution prepared according to Example 2, the liquor having been adjusted to a pH value of 5.5 with 20% strength acetic acid.

The fabric padded in this way is dried at a temperature of 120° C. and is then thermosol-treated for 90 seconds at a temperature of 170° C.

The dyeing is then after-treated by soaping at the boil.

A red dyeing, without grey haze (frosting effect) is thus obtained on the polyester constituent of the fabric.

EXAMPLE 85

A mixed fabric of polyester fibres and viscose staple fibres mixed in the ratio of 20:80 is padded, the liquor pick-up being 60% relative to dry weight, with a liquor which contains, per liter of water, 50 g of the disperse dyestuff C.I. Disperse Red 73 in its commercial form and nature, and 30 ml of the 4% strength polymer solution prepared according to Example 3, the liquor having been adjusted to a pH value of 5.5 with 20% strength acetic acid.

The fabric padded in this way is dried at a temperature of 130° C. and is then thermosol-treated for 70 seconds at a temperature of 190° C.

The dyeing is then after-treated by soaping at the boil.

A red dyeing, without grey haze (frosting effect) is thus obtained on the polyester constituent of the fabric.

EXAMPLE 86

A mixed fabric of polyester fibres and viscose staples fibres mixed in the ratio of 30:70 is padded, the liquor pick-up being 60% relative to dry weight, with a liquor shich contains, per liter of water, 50 g of the disperse dyestuff C.I. Disperse Orange 32 in its commercial from and nature, and 30 ml of the 4% strength polymer solution prepared according to Example 4, the liquor having been adjusted to a pH value of 5.5 with 20% strength acetic acid.

The fabric padded in this way is dried at a temperature of 130° C. and is then thermosol-treated for 60 seconds at a temperature of 220° C.

The dyeing is then after-treated by soaping at the boil.

An orange dyeing, without grez haze (frosting effect) is thus obtained on the polyester constituent of the fabric.

EXAMPLE 87

A mixed fabric of polyester fibres and cotton fibres mixed in the ratio of 40:60 is padded, the liquor pick-up being 50% relative to dry weight, with a liquor which contains, per liter of water, 50 g of the disperse dyestuff C.I. Disperse Orange 13 in its commercial form and nature, and 10 ml of the 4% strength polymer solution prepared according to Example 5, the liquor having been adjusted to a pH value of 5.5 with 20% strength acetic acid.

The fabric padded in this way is dried at a temperature of 130° C. and is then thermosol-treated for 70 seconds at a temperature of 180° C.

The dyeing is then after-treated by soaping at the boil.

An orange dyeing without grez haze (frosting effect) is thus obtained on the polyester constituent of the fabric.

EXAMPLE 88

A mixed fabric of polyester fibres and viscose staple fibres mixed in the ratio of 50:50 is padded, the liquor pick-up being 50% relative to dry weight, with a liquor which contains, per liter of water, 50 g of the disperse dyestuff C.I. Disperse Red 200 in its commercial form and nature, and 20 ml of the 4% strength polymer solution prepared according to Example 6, the liquor having been adjusted to a pH value of 5.5 with 20% strength acetic acid.

The fabric padded in this was is dried at a temperature of 130° C. and is then thermosol-treated for 80 seconds at a temperature of 170° C.

The dyeing is then after-treated by soaping at the boil.

A red dyeing, without grez haze (frosting effect) is thus obtained on the polyester constituent of the fabric.

What is claimed:

1. In the method of dyeing of polyester fibers with a disperse dye while those fibers are mixed with cellulose fibers, the improvement according to which haze formation is suppressed by applying the disperse dye from a liquor containing in addition to a dispersant about 0.2 to about 5 grams per liter of a normally liquid copolymer of
    (a) one mol acrylamide, alpha- or beta-methyl acrylamide, maleamic acid or fumaramic acid, with
    (b) from about 0.01 to about 5 mols of

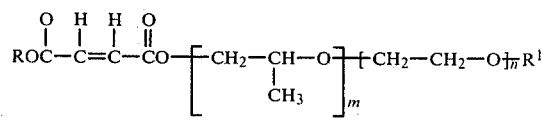

where R is H, NH$_4$, Na, K, HOCH$_2$—CH$_2$— or

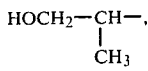

R¹ is alkyl or alkenyl with up to 20 carbons, alkenyl with from 3 to 20 carbons, phenyl, naphthyl, alkylphenyl with up to 12 alkyl carbons, alkanoyl or alkenoyl with 4 to 20 carbons;
and
m plus n are whole numbers totalling between 1 and about 30,
and
(c) from zero to ten mols of

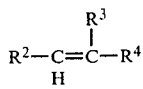

where $R^2$ and $R^3$ are both H, or one of them is H and the other methyl, or $R^3$ is H and $R^2$ is carboxyl or alkoxycarbonyl having up to 10 alkoxy carbons, or $R^2$ is H and $R^3$ is —CH$_2$COOH or alkoxycarbonyl methylene having up to 10 alkoxy carbons, and any of these $R^3$ alkoxycarbonyls can be substituted by hydroxy, alkoxy with up to 10 carbons, or mono- or di-alkyl amino having up to 4 carbons; and $R^4$ is cyano, carboxyl, —SO$_3$H, sulfo-alkylene having up to 6 carbons, alkanoyloxy with up to 6 carbons, alkanoylamino with up to 7 carbons that can form a pyrrolidone, piperidone, caprolactam ring wth the amino, alkoxycarbonyl with up to 10 alkoxy carbons and in which the alkyl of the alkoxy can be further substituted with hydroxy, up to C$_4$ alkoxy, amino, mono- or di-alkyl amino having up to 4 carbons or

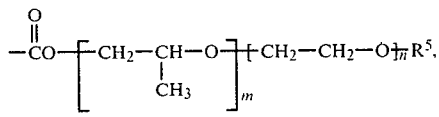

$R^5$ being alkyl with up to 20 carbons, alkenyl with from 3 to 20 carbons, phenyl, naphthyl, alkylphenyl with up to 12 alkyl carbons, or alkanoyl or alkenoyl with 4 to 20 carbons and 12 alkyl carbons, or alkanoyl or alkenoyl with 4 to 20 carbons and m and n are whole numbers totalling between 1 and about 30;
the copolymer being miscible with water in all proportions at about 10° C., and in a 4% by weight solution in water giving a viscosity of between about 500 and about 20,000 centipoise at 25° C.

2. The method of claim 1 in which the $R^4$ sulfoalkylene is sulfo-methylene, the $R^4$ alkoxycarbonyl has up to 5 alkoxy carbons and may be substituted with hydroxy, dimethylamino or

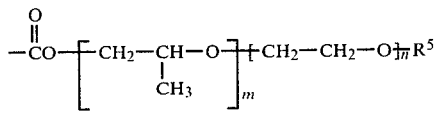

in which $R^5$ is alkyl or alkenyl of about 13 to about 18 carbons, phenyl, alkylphenyl with about 4 to about 9 alkyl carbons, or alkanoyl or alkenyl with about 14 to about 18 carbons,
$R^2$ is hydrogen, and
$R^3$ is hydrogen or methyl.

3. The method of claim 1 in which $R^1$ is alkyl or alkenyl having about 13 to about 18 carbons, phenyl, alkylphenyl with about 4 to about 9 alkyl carbons, or alkanoyl or alkenoyl having about 14 to about 18 carbons.

4. The method of claim 1 in which the mixture of fibers is in the form of a textile fabric having from about 20 to 80% cellulosic fibers by weight.

5. The method of claim 4 in which the cellulosic fibers are rayon fibers.

6. The method of claim 1 in which the dyeing is effected with a dye liquor that also contains dissolved dye that dyes the cellulosic fibers while the polyester fibers are being dyed.

7. The method of claim 6 in which the dye that dyes the cellulosic fibers is a reactive dye.

8. The method of claim 1 in which ingredient (a) is acrylamide or methacrylamide.

9. The method of claim 1 in which the mol proportions of ingredients (b) and (c), in relation to (a), are from 0.05 to 1 and from zero to three, respectively.

10. In an aqueous dye bath for disperse dyeing of polyester fibers, which bath has micron-size particles of at least one water-insoluble disperse dye dispersed with the help of dispersing agents, the total quantity of disperse dye being at least about 30 grams per liter of bath, the improvement according to which the bath additionally contains about 0.2 to about 5 grams per liter of the copolymer of claim 1.

* * * * *